US012098961B2

(12) United States Patent
Bellifemine

(10) Patent No.: US 12,098,961 B2
(45) Date of Patent: Sep. 24, 2024

(54) NON-CONTACT INFRARED THERMOMETER

(71) Applicant: TECNIMED S.r.l., Vedano Olona (IT)

(72) Inventor: Francesco Bellifemine, Varese (IT)

(73) Assignee: TECNIMED S.r.l., Vedano Olona (IT)

( * ) Notice: Subject to any disclaimer, the term of this patent is extended or adjusted under 35 U.S.C. 154(b) by 613 days.

(21) Appl. No.: 17/334,871

(22) Filed: May 31, 2021

(65) Prior Publication Data
US 2021/0341341 A1 Nov. 4, 2021

Related U.S. Application Data

(63) Continuation-in-part of application No. 16/024,219, filed on Jun. 29, 2018, now Pat. No. 11,022,496.

(51) Int. Cl.
G01K 13/20 (2021.01)
G01J 5/00 (2022.01)
G01J 5/02 (2022.01)
G01J 5/04 (2006.01)
G01J 5/08 (2022.01)
G01K 1/08 (2021.01)
G06V 40/16 (2022.01)
G01J 5/80 (2022.01)

(52) U.S. Cl.
CPC .......... *G01K 13/223* (2021.01); *G01J 5/0025* (2013.01); *G01J 5/0265* (2013.01); *G01J 5/027* (2013.01); *G01J 5/0275* (2013.01); *G01J 5/04* (2013.01); *G01J 5/0896* (2013.01); *G01K 1/08* (2013.01); *G06V 40/172* (2022.01); *G01J 5/80* (2022.01)

(58) Field of Classification Search
CPC ...... G01K 13/223; G01K 1/08; G06V 40/172; G01J 5/0025; G01J 5/0265; G01J 5/027; G01J 5/0275; G01J 5/04; G01J 5/0896; G01J 5/80
See application file for complete search history.

(56) References Cited

U.S. PATENT DOCUMENTS

| | | | | |
|---|---|---|---|---|
| 4,634,294 A * | 1/1987 | Christol | ................. | G01J 5/025 374/170 |
| 5,736,726 A | 4/1998 | VanHorn et al. | | |
| 6,337,400 B1 * | 1/2002 | Kamihara | ............ | C07D 471/04 546/183 |
| 6,527,439 B1 * | 3/2003 | Bellifemine | .............. | G01J 5/08 374/141 |
| 6,742,927 B2 * | 6/2004 | Bellifemine | .......... | G01J 5/0022 374/142 |
| 7,390,124 B2 * | 6/2008 | Kienitz | ................... | G01J 5/084 374/131 |

(Continued)

FOREIGN PATENT DOCUMENTS

| | | |
|---|---|---|
| CN | 206945141 U | 1/2018 |
| CN | 210136004 U | 3/2020 |
| ES | 1073816 U | 2/2011 |

Primary Examiner — Randy W Gibson

(57) ABSTRACT

The present invention relates to an infrared thermometer (1) able to project the detected temperature directly on the surface (6a) of the body (2) to be measured. The determination of the ideal distance of the thermometer from the body, necessary for the correct detection of the temperature thereof, being visually identifiable by means of the relative position of luminous shapes (8a, 8b) projected on the body to be measured (6).

30 Claims, 13 Drawing Sheets

(56) References Cited

U.S. PATENT DOCUMENTS

| | | | | |
|---|---|---|---|---|
| 8,251,578 | B1* | 8/2012 | Tseng | G01J 5/0265 374/128 |
| 8,800,875 | B2* | 8/2014 | Mangaroo | G06K 7/10881 235/472.01 |
| 8,821,010 | B2* | 9/2014 | Bellifemine | G01J 5/0022 600/549 |
| 9,846,082 | B2* | 12/2017 | Xu | G01J 5/0808 |
| 11,022,496 | B2* | 6/2021 | Bellifemine | G01J 5/0265 |
| 2006/0215728 | A1* | 9/2006 | Jang | G01J 5/02 374/121 |
| 2007/0139204 | A1 | 6/2007 | Weng et al. | |
| 2011/0049243 | A1 | 3/2011 | Gong et al. | |
| 2013/0202009 | A1* | 8/2013 | Murugan | G01J 5/07 374/E1.002 |
| 2013/0215928 | A1* | 8/2013 | Bellifemine | A61B 5/01 374/121 |
| 2014/0036068 | A1* | 2/2014 | Nguyen | G01J 5/0265 348/135 |
| 2020/0003623 | A1 | 1/2020 | Bellifemine | |

* cited by examiner

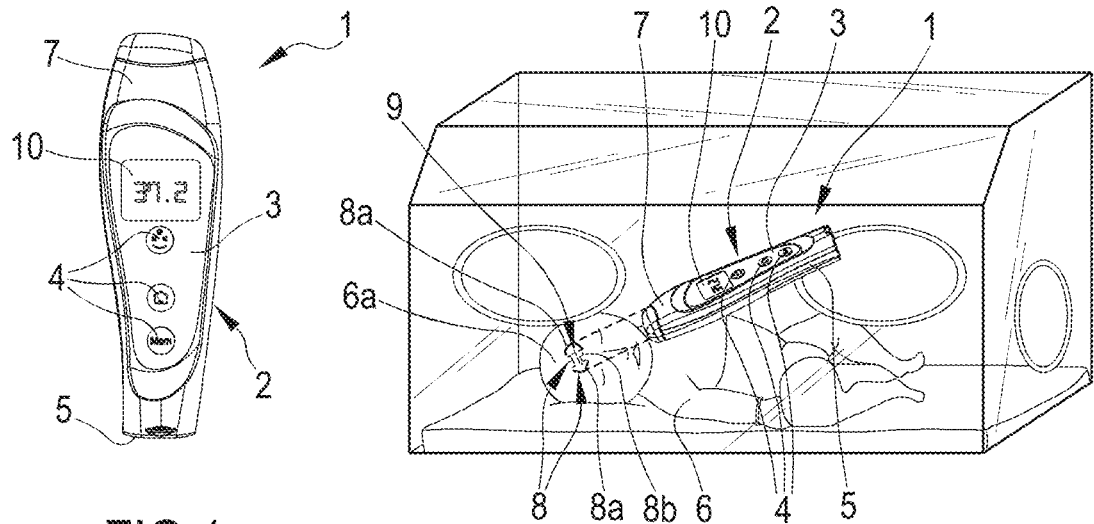
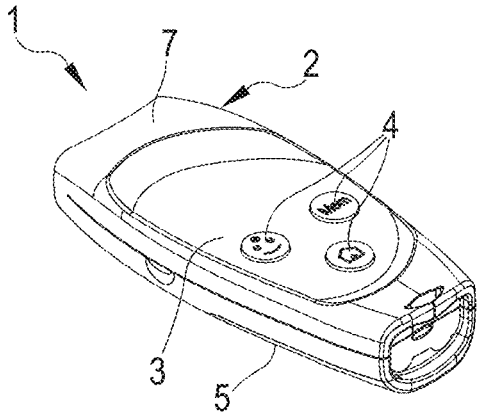
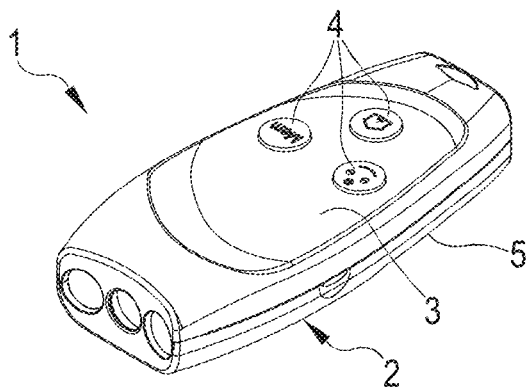
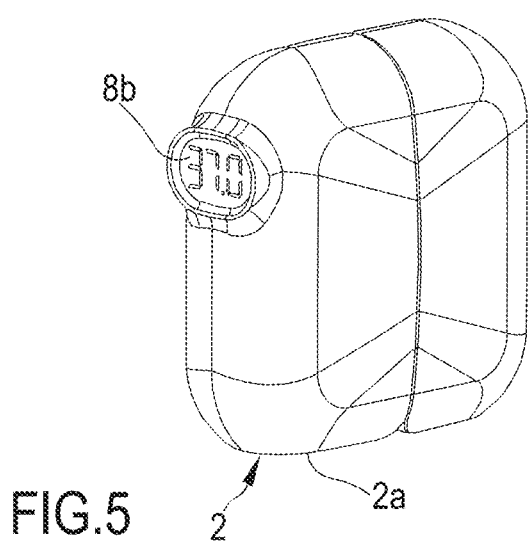
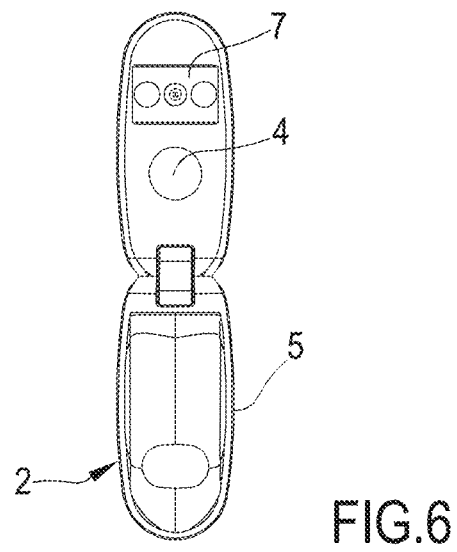
FIG.1　FIG.2　FIG.3　FIG.4　FIG.5　FIG.6

NON-CONTACT INFRARED THERMOMETER

CROSS-REFERENCE TO RELATED APPLICATIONS

This continuation-in-part application claims priority to and the benefit under 35 USC § 120 of U.S. patent application Ser. No. 16/024,219, filed on Jun. 29, 2018 and titled "Infrared Thermometer," the content of which is incorporated by reference in its entirety as if fully set forth herein.

FIELD OF THE INVENTION

The present invention relates to an infrared thermometer. The object of the present invention is among the thermometers that allow the detection of the temperature of a body without necessarily coming into contact therewith. In particular, the thermometer reads the temperature detecting the infrared radiation emitted by the region of interest of the body whose temperature is to be known and it determines said temperature according to the detected infrared radiation intensity.

The object according to the present invention is usable, for example, in the sector of the medical devices and instruments normally used in clinical/hospital contexts. However, the thermometer is also usable in the veterinary field or to measure the temperature of objects (for example, food or drinks).

BACKGROUND

As is well known, there are several types of infrared thermometers that allow the detection of body temperature at a close distance from the body whose temperature needs to be known.

Some of these infrared thermometers are provided with an appropriate pointing device which enables the user to identify the suitable distance for detecting the temperature of the body to be measured.

Once the ideal position for measuring the temperature is reached, one or more infrared radiation sensors detect the infrared emission of a portion of one of the external surfaces of the body to be measured.

On the basis of this detection and of the ambient temperature, infrared thermometers can determine the temperature of the surface to be measured and/or calculate the real internal temperature of the body (for example by exploiting appropriate conversion tables or applying appropriate correctives starting from the measured external temperature of the subject and the ambient temperature); the value of the measured temperature is shown on liquid crystal displays or to Led located on the corresponding casings or shells.

Although some known infrared thermometers allow for an easy detection of the temperature of the bodies to be measured without coming into contact therewith, the Applicant has detected that they are not free of some drawbacks and are improvable according to different aspects, mainly in relation to their correct positioning with respect to the bodies to be measured, to convenience in reading the measurements made, to the time necessary for reading the measurements made, as well as to the practicality in performing a series of measurements and of readings of the temperature in close sequence.

In particular, the Applicant has detected that the search for the ideal position for detecting the temperature (if provided) is not always simple and is not always intuitive.

To overcome this drawback, thermometers provided with optical, ultrasonic or electromagnetic wave systems for determining the correct distance have been realized, however, these systems impact the overall marketing costs of the instrument and are not always easy to use.

It should also be considered that known infrared thermometers allow reading the detected temperature through a dedicated display arranged externally on their casing. Consequently, the operation of detecting and reading the temperature of the bodies being measured requires at first the correct positioning of the thermometers with respect to the bodies being measured, pointing them suitably toward the bodies, then, once the measurement is taken, the appropriate orientation to be able to read the display and the temperature calculated on the basis of the respective measurements. The time required for this operation, which generally may vary between 2 and 4 seconds, is not negligible when, in clinical and hospital contexts, for example, or in airport checks, it is necessary to carry out a significant number of consecutive measurements and readings.

Moreover, in case of non-backlit display, the detection has to be read in a lighted environment; this creates some problems during night-time measurements. On the other hand, backlit displays consume energy and therefore require more frequent replacement of the batteries.

OBJECT OF THE INVENTION

The main purpose of the present invention is to propose an infrared thermometer able to solve one or more of the problems detected in the prior art.

An additional purpose of the present invention according to some claims is to propose an infrared thermometer that allows rapid and practical identification of the correct position for detecting the temperature and an immediate reading thereof.

Another purpose of the present invention is to propose an infrared thermometer that is convenient to use.

A further purpose of the present invention is to propose an infrared thermometer that allows a rapid reading of the detected temperature.

It is also a purpose of the present invention is to propose an infrared thermometer that has low construction and marketing costs.

These purposes and others besides, together with a series of advantages, are substantially obtained by an infrared thermometer, in accordance with what is described and expressed in the claims that follow.

SUMMARY

Aspects of the invention will be described in the following.

In an independent aspect an infrared thermometer is provided comprising:
- a casing having a control portion, a grip portion and a pointing and detection portion;
- an infrared temperature detector configured to receive infrared radiations coming from a destination surface of the patient to detect the temperature of the destination surface;
- a positioning device to allow determining a detection position of the infrared temperature detector at a correct distance from the destination surface;
- a programmable electronic unit arranged inside the casing and connected to at least the infrared temperature detector and the positioning device, the programmable electronic unit being programmed to:
calculate a real temperature of the body when the infrared temperature detector is in the detection position of the infrared thermometer, wherein the calculation of the real temperature of the body is made on the basis of the temperature detected at the destination surface, of a correction factor (being an ambient temperature) and of predetermined coefficients relating to a type of destination surface to be measured;
an optical reader at least partially housed within the casing at the gripping portion, said optical reader being directly connected to the programmable electronic unit and configured to read a code by proximity.

The positioning device may include optical converging rays or an ultrasound emitter/received or an image projection on the patient to compose at the correct distance. Other embodiments to allow determining a correct distance may alternatively be used.

In a simpler infrared thermometer, the positioning device may be absent and, for example, only an indication to the user for the correct distance from the patient included in the instruction leaflet.

In a 1st further independent aspect, it is provided an infrared thermometer comprising:
a casing having a control portion, a grip portion and a pointing and detection portion;
a pointing device arranged in the pointing and detection portion of the casing, the pointing device including:
a first and a second light emitter of at least a first and a second light beam towards a destination surface of the body to be measured,
at least one shutter element positioned relative to the emitter so as to be impacted by the first light beam emitted by the first light emitter, wherein the shutter element comprises at least one plate presenting at least one through opening having a shape configured for forming a first luminous shape on said destination surface,
a display positioned relative to the emitter so as to be impacted by the second light beam emitted by the emitter, wherein the display is configured to confer to the second light beam a second luminous shape of a variable form,
an optical mechanism configured to cause a displacement of one of said first and second luminous shapes with respect to the other, as a result of a thermometer displacement relative to said destination surface, between a series of search positions relating to unsuitable distances of the infrared thermometer from said detection surface for the correct detection of the temperature of the body to be measured by the infrared thermometer and at least one detection position indicative of an ideal distance of the infrared thermometer from said detection surface for the detection of the temperature of the body to be measured by the infrared thermometer;
an infrared temperature detector at the pointing and detection portion of the casing, the infrared temperature detector being configured to detect the temperature of said destination surface at least when the first and second luminous shapes are in the detection position;
a programmable electronic unit arranged inside the casing and connected to at least the infrared temperature detector and to the pointing device, the programmable electronic unit being programmed to:
calculate a real temperature of the body when the first and second luminous shapes defined on said destination surface are in the search position corresponding to the detection position of the infrared thermometer, wherein the calculation of the real temperature of the body is made on the basis of the temperature detected at the destination surface, of a correction factor, being e.g., an ambient temperature, and of predetermined coefficients relating to a type of destination surface to be measured;
control the display to form of the second luminous shape corresponding to the temperature of the body calculated by the programmable electronic unit, when the infrared thermometer is in the detection position.

In a further aspect it is provided an infrared thermometer comprising:
a casing having a control portion, a grip portion and a pointing and detection portion;
a pointing device arranged in the pointing and detection portion of the casing, the pointing device including:
a first and a second light emitter of at least a first and a second light beam towards a destination surface of the body to be measured,
at least one shutter element positioned relative to the emitter so as to be impacted by the first light beam emitted by the first light emitter, wherein the shutter element comprises at least one plate presenting at least one through opening having a shape configured for forming a first luminous shape on said destination surface,
a display positioned relative to the emitter so as to be impacted by the second light beam emitted by the emitter, wherein the display is configured to confer to the second light beam a second luminous shape of a variable form,
an optical mechanism configured to cause a displacement of one of said first and second luminous shapes with respect to the other, as a result of a thermometer displacement relative to said destination surface, between a series of search positions relating to unsuitable distances of the infrared thermometer from said detection surface for the correct detection of the temperature of the body to be measured by the infrared thermometer and at least one detection position indicative of an ideal distance of the infrared thermometer from said detection surface for the detection of the temperature of the body to be measured by the infrared thermometer;
an infrared temperature detector at the pointing and detection portion of the casing, the infrared temperature detector being configured to detect the temperature of said destination surface at least when the first and second luminous shapes are in the detection position;
a programmable electronic unit arranged inside the casing and connected to at least the infrared temperature detector and to the pointing device, the programmable electronic unit being programmed to:
calculate a real temperature of the body when the first and second luminous shapes defined on said destination surface are in the search position corresponding to the detection position of the infrared thermometer, wherein the calculation of the real temperature of the body is made on the basis of the temperature detected at the destination surface, of a correction factor, being e.g., an ambient temperature, and of predetermined coefficients relating to a type of destination surface to be measured;
control the display to form of the second luminous shape corresponding to the temperature of the body calculated by the programmable electronic unit, when the infrared thermometer is in the detection position;
an optical reader at least partially housed within the casing at the gripping portion, said optical reader being directly connected to the programmable electronic unit and configured to read a code by proximity.

In a further independent aspect it is provided an infrared thermometer comprising:
a casing having a control portion, a grip portion and a pointing and detection portion;
a pointing device arranged in the pointing and detection portion of the casing, the pointing device emitting at least one selected between an optical or a frequency signal directed towards a destination surface of the body to be measured,
an infrared temperature detector at the pointing and detection portion of the casing, the infrared temperature detector being configured to detect the temperature of said destination surface at least when the first and second luminous shapes are in the detection position;
a programmable electronic unit arranged inside the casing and connected to at least the infrared temperature detector and to the pointing device, the programmable electronic unit being programmed to:
  determine a measuring distance between the pointing device and the destination surface by means of the optical or the frequency signal generated by the emitter,
  determine a real temperature of the body when the measuring distance corresponds to a ideal distance, wherein the calculation of the real temperature of the body is made on the basis of the temperature detected at the destination surface, of a correction factor, being e.g., an ambient temperature, and of predetermined coefficients relating to a type of destination surface to be measured,
an optical reader at least partially housed within the casing at the gripping portion, said optical reader being directly connected to the programmable electronic unit and configured to read a code by proximity.

In a further independent aspect it is provided an infrared thermometer comprising:
a casing having a control portion, a grip portion and a pointing and detection portion;
a pointing device arranged in the pointing and detection portion of the casing, the pointing device including:
  a first light emitter of at least a first light beam towards a destination surface of the body to be measured,
  a secondary light emitter of at least a secondary light beam towards a destination surface of the body to be measured,
  at least one shutter element positioned relative to the emitter so as to be impacted by the first light beam, wherein the shutter element comprises at least one plate presenting at least one through opening having a shape configured for forming a first luminous shape on said destination surface,
  at least one auxiliary shutter element positioned relative to the emitter so as to be impacted by the secondary light beam, wherein the auxiliary shutter element comprises at least one plate presenting at least one through opening having a shape configured for forming a secondary luminous shape on said destination surface,
  an optical mechanism configured to cause a displacement of one of said first and secondary luminous shapes with respect to the other, as a result of a thermometer displacement relative to said destination surface, between a series of search positions relating to unsuitable distances of the infrared thermometer from said detection surface for the correct detection of the temperature of the body to be measured by the infrared thermometer and at least one detection position indicative of an ideal distance of the infrared thermometer from said detection surface for the detection of the temperature of the body to be measured by the infrared thermometer;
an infrared temperature detector at the pointing and detection portion of the casing, the infrared temperature detector being configured to detect the temperature of said destination surface at least when the first and second luminous shapes are in the detection position;
a programmable electronic unit arranged inside the casing and connected to at least the infrared temperature detector and to the pointing device, the programmable electronic unit being programmed to calculate a real temperature of the body when the first and second luminous shapes defined on said destination surface are in the search position corresponding to the detection position of the infrared thermometer, wherein the calculation of the real temperature of the body is made on the basis of at least the temperature detected at the destination surface, and a correction factor, being e.g., an ambient temperature.

In a 2nd aspect according to any of the previous aspects, the infrared thermometer comprises an optical reader (110) at least partially housed within the casing at the gripping portion.

In a 3rd aspect according to the preceding aspect, the optical reader (110) is directly connected to the programmable electronic unit (103) and configured to:
  allow reading an identification code of a patient whose temperature is measured by the infrared thermometer,
  send the identification code to the programmable electronic unit,
wherein the identification code is unique and allows identifying the patient.

In one example, the identification code may be placed on a patient bracelet (as commonly used in hospitals), or may be on a patient card, such as his/her health card.

In a 4th aspect according to the 2nd aspect the optical reader (110) comprises at least one laser beam generator configured to emit at least one laser beam towards the identification code to be detected.

In a 5th aspect according to any one of three preceding aspects, the optical reader (110) comprises at least one selected between a QR code reader and a barcode reader. In a 6th aspect according to any one of the preceding aspects, the programmable electronic unit (103) comprises at least one memory unit configured to store data calculated and/or measured by the programmable electronic unit (103).

In a 7th aspect according to the preceding aspect, the memory unit is selectively removable from the casing.

In an 8th aspect according to the preceding aspect, the memory unit is configurable between:
  a first operative condition wherein the memory unit is housed within the casing and connected to the programmable electronic unit (103), and a second operative condition wherein the memory unit is removed from the casing and unconnected to the programmable electronic unit (103).

In a 9th aspect according to any one of the preceding aspects, the programmable electronic unit (103) is configured to execute a temperature measuring procedure including the steps of:
reading the identification code of the patient,
measure the temperature of the patient,
determine a status value as an array of values including:
the identification code of the patient,
the temperature of the patient,
a time value representative of the time instant in which the temperature measurement is taken,
save a status value in the memory unit.

In a 10th aspect according to the preceding aspect the programmable electronic unit (103) is configured to execute the step of measuring the temperature of the patient following receipt of the identification code scanned by the optical reader (110), in particular exclusively after the receipt of the identification code. In an 11th aspect according to the preceding aspect the casing includes a selection button (116) at the control portion, said selection button (116) being connected to the programmable electronic unit (103) and configured to send to the programmable electronic unit (103) at least one of:
a confirmation signal representative of a correct temperature measurement taken by the user,
a discard signal representative of a wrong temperature measurement taken by the user.

In a 12th aspect according to the preceding aspect the step of saving the measured temperature in the memory unit occurs following receipt of the confirmation signal by the selection button (116).

In a 13th aspect according to any one of the two preceding aspects the programmable electronic unit, following receipt of the discard signal by the selection button, is configured to discard the measured temperature of the patient and re-execute the step of measure the temperature of the patient.

In a 14th aspect according to any one of the preceding aspects the programmable electronic unit (103) is configured to save a plurality of status values having the same identification code.

In a 15th aspect according to any one of the preceding aspects the infrared thermometer comprises at least one transmitter (117) at least partially housed within the casing and connected to the programmable electronic unit (103).

In a 16th aspect according to the preceding aspect, the transmitter (117) is configured to communicate the stored status value to an external device or to an external database.

In a 17th aspect according to any one of the two preceding aspects, the transmitter (117) includes an antenna (118) allowing the infrared thermometer to wirelessly transmit the stored status value to an external device or database.

In an 18th aspect according to any one of the three preceding aspects the transmitter (117) comprises at least one selected between a Bluetooth module, an infrared module and a Wi-Fi module.

In a 19th aspect according to any one of the preceding aspects the infrared thermometer comprises at least one energy accumulator (112) connected to one or more of: the programmable electronic unit (103), the pointing device, the optical reader (110) and the infrared temperature detector.

In a 20th aspect according to the preceding aspect the energy accumulator (112) is a rechargeable battery connected (at least) to the programmable electronic unit; said programmable electronic unit being optionally configured to measure a voltage of the rechargeable battery representative of a residual state of charge of the battery.

In a 21st aspect according to the preceding aspect the programmable electronic unit (103), following the measurement of the voltage representative of the residual state of charge of the rechargeable battery, is configured to calculate a state of charge value as the ratio between the measured voltage representative of the residual state of charge of the battery and the maximum voltage that can be supplied by the battery.

In a 22nd aspect according to any one of the preceding aspects comprising an auxiliary display (10) configured to display said state of charge value calculated by the programmable electronic unit.

In a 23rd aspect according to any one of the two preceding aspects the programmable electronic unit is further configured to determine a low state of charge of the rechargeable battery when the state of charge value is comprised between 0 and 0.2, optionally comprised between 0 and 0.15, still more optionally comprised between 0 and 0.1;
wherein the auxiliary display (10) is configured to display the low state of charge of the rechargeable battery.

In a 24th aspect according to any one of the preceding aspects the infrared thermometer comprises an induction coil (190) housed within the casing at the gripping portion.

In a 25th aspect according to the preceding aspect the induction coil (190) is connected to the energy accumulator and configured to wirelessly transfer energy from an external power supply to the energy accumulator (112).

In a 26th aspect according to any one of the preceding aspects, the infrared thermometer comprises an auxiliary optical sensor (111) at least partially housed within the casing and configured to take an image of the body to be measured.

In a further aspect according to the preceding aspect the auxiliary optical sensor comprises a camera configured to take an image, for example, of the patient.

In a 27th aspect according to the preceding aspect the programmable electronic unit is connected to said auxiliary optical sensor (111), in particular it is connected to the camera, and configured to receive and store in the memory unit the image captured by the camera.

In a 28th aspect according to the preceding aspect the casing includes a camera button (113) at the control portion, said camera button (113) being connected to the programmable electronic unit and configured to send to programmable electronic unit a control signal, wherein the programmable electronic unit is configured to:
receive the control signal by the camera button (113),
command the auxiliary optical sensor (111) to take an image of the body to be measured.

In a 29th aspect according to any one of the two preceding aspects the programmable electronic unit, following receipt the image of the body of the patient captured by the camera, is configured to:
associate the image captured by the auxiliary optical sensor to the identification code of the patient and the time instant in which the image is taken, save in the memory unit the image captured by the auxiliary optical sensor together with the identification code of the patient and the time instant in which the image is taken.

In a 30th aspect according to any one of the preceding aspects the programmable electronic unit is configured to:
retrieve from the memory unit the image captured by the auxiliary optical reader, the identification code of the patient and the time instant in which the image is taken, command the transmitter (117) to communicate the image captured by the auxiliary optical reader, the identification code of the patient and a time instant in which the image is taken to an external device or database.

In a 31st aspect according to any one of the preceding aspects the casing is elongated and extends between a front portion where the pointing device is placed and a rear portion.

In a 32nd aspect according to any one of the preceding aspects the casing further comprises an upper portion (1103) and a lower portion, the optical reader being placed at the rear portion (151) and faces downwards, optionally a rechargeable battery being placed in correspondence of the rear portion (151).

In a 33rd aspect according to any one of the preceding aspects the optical reader (110), the transmitter (117) and the rechargeable battery are embedded in the casing.

In a 34th aspect according to any one of the preceding aspects, the optical reader is positioned substantially flush with the casing.

In a 35th aspect according to any one of the preceding aspects, the optical reader is covered or protected by a transparent portion, part or connected to the casing.

In a 36th aspect according to any one of the preceding aspects, the casing embeds the optical reader, the rechargeable battery and the coil, an access door being optionally provided to access the rechargeable battery and possibly the coil.

In a 37th aspect according to any one of the preceding aspects, the pointing device includes a secondary light emitter of at least a secondary light beam towards a destination surface of the body to be measured.

In a 38th aspect according to any one of the preceding aspects the pointing device includes at least one auxiliary shutter element positioned relative to the emitter so as to be impacted by the secondary light beam. In a 39th aspect according to the preceding aspects the auxiliary shutter element comprises at least one plate presenting at least one through opening having a shape configured for forming a secondary luminous shape on said destination surface.

In a 40th aspect according to any one of the preceding aspects the optical mechanism of the pointing device comprises one or more lenses arranged at the pointing and detection portion, the lenses being configured so as deflect one or both the first light beam and the second light beam to align the first and secondary luminous shapes in the detection position when the infrared thermometer is at the ideal distance for the detection of the temperature of the body to be measured, and wherein optionally at least one lens of the optical mechanism is a biconvex lens able to concentrate and focus light at a predetermined distance.

In a 41st aspect according to any one of the preceding aspects the auxiliary shutter element is defined, in the pointing and detection portion, for example by a structure of the casing.

In a 42nd aspect according to any one of the preceding aspects the auxiliary shutter element has at least one through opening having the shape to be given to the secondary light beam to define the secondary luminous shapes on the destination surface of the body to be measured, the through opening of the shutter element being impacted by the secondary light beam.

In a 43rd aspect according to any one of the preceding aspects the through opening of the auxiliary shutter element has a shape that gives to the secondary luminous shape a form selected among:

the form of a single arc,
the form of at least two arcs with opposite concavities,
the form of a polygonal chain having a central segment from whose ends two respective lateral segments extend perpendicularly,
the form of a laid-down "C",
the form of two points distanced from each other, the form of a circle, defined by a plurality of distributed points, and
the form of a circle, defined by a continuous or substantially continuous line.

In a 44th aspect according to any one of the preceding aspects the auxiliary shutter element is positioned in the pointing and detection portion of the casing and is interposed between the first light emitter and the destination surface of the body to be measured.

In a 45th aspect according to any one of the preceding aspects the infrared thermometer comprises at least one handle device.

In a 45bis aspect according to the preceding aspect, the handle device is removably engaged to the casing 2.

In further aspect 45ter according to the 45th aspect, the handle device is in single body with the casing 2.

In a 46th aspect according to any one of preceding aspects 45 the handle device includes a housing having an elongated conformation extending between a lower end portion and an upper end portion.

In a 47th aspect according to the preceding aspect the housing of the handle device has a substantially oval transversal cross section in a section transversal to an elongation axis extending between the lower end and the upper end portion.

In a 48th aspect according to any one of the preceding aspects from 45 to 47, wherein the handle device comprises at least one constrain portion defined at the upper end portion of the housing of the handle device.

In a 49th aspect according to the preceding aspect wherein the constraining portion having at least one protuberance configured to (e.g., be inserted within the casing and) engage the casing to the handle device.

In a 50th aspect according to any one of the preceding aspects from 45 to 49 wherein the housing of the handle device has a clamping portion extending away from the upper end portion to engage the casing.

In a 51st aspect according to the preceding aspect the clamping portion has a shape (for example substantially a "C" shape) configured to prevent a displacement of the casing with respect to the housing of the handle device.

In a 52nd aspect according to any one of the preceding aspects, when the casing 2 is constrained to the handle device, the rear portion of the casing 2 is in contact with the clamping portion.

In a 53rd aspect according to any one of the preceding aspects, when the casing 2 is constrained to the handle device, the lower portion of the casing 2 is in contact with the upper end portion of the handle device. In a 54th aspect according to any one of the preceding aspects, when the casing 2 is constrained to the handle device, the casing 2 lies substantially orthogonally to a grip portion 5', this latter defined in interposition between the upper end portion and the lower end portion of the envelope 161.

In a 55th aspect according to any one of the preceding aspects, the infrared thermometer comprises an optical reader at least partially housed within the housing of the handle device particularly at the lower end portion. In a 56th aspect according to the preceding aspect the optical reader is connected to the programmable electronic unit and configured to:

allow reading an identification code representative of a patient or an animal whose temperature is measured by the infrared thermometer, record and/or send the identification code to the programmable electronic unit, wherein the identification code is unique and allows identifying the patient or the animal.

In a 57th aspect according to any one of the two preceding aspects the optical reader comprises either a QR code reader or a barcode reader or a number code to be identified via OCR (Optical Character Recognition).

In a 58th aspect according to any one of the preceding aspects, the infrared thermometer comprises at least one auxiliary rechargeable battery housed within the housing of the handle device.

In a 59th aspect according to the preceding aspect the rechargeable battery is connectable to one or more of: the programmable electronic unit, the pointing device, the optical reader and the infrared temperature detector. In a 60th aspect according to any one of the preceding aspects, the infrared thermometer comprises at least one auxiliary battery housed within the housing of the handle device.

In a 61st aspect according to the preceding aspect the rechargeable battery is connectable to one or more of: the programmable electronic unit, the pointing device, the optical reader and the infrared temperature detector. In a 62nd aspect according to any one of the preceding aspects the handle device comprises at least one socket defined on the housing and connected to the auxiliary rechargeable battery.

In a 63rd aspect according to the preceding aspect the socket is configured to allow an energy transfer between a power source external the handle device to the auxiliary rechargeable battery by means of a charging cable.

In a 64th aspect according to any one of the two preceding aspects the socket of the handle device includes at least one selected in the group consisting of:
- a USB port,
- a miniUSB port,
- a microUSB port,
- a USB-C port.

In a 65th aspect according to any one of the preceding aspects the handle device includes at least one auxiliary selection button at least partially housed within on the housing.

In a 66th aspect according to the preceding aspect the auxiliary selection button is connected to the programmable electronic unit and configured to send to the programmable electronic unit at least a confirmation signal to acquire a temperature reading.

In a 67th aspect according to the preceding aspect the confirmation signal is representative of a correct temperature measurement taken by the user.

In a 68th aspect according to any one of the preceding aspects the auxiliary selection button has a three-dimensional size, said auxiliary selection button being movable at least between:
- a retracted position wherein a part of the three-dimensional size of the auxiliary selection button is housed within the housing of the handle device,
- a released position wherein the part of the three-dimensional size of the auxiliary selection button lies outside the housing of the handle device.

In a 69th aspect according to any one of the preceding aspects the infrared thermometer comprises at least one vibrating motor housed within the housing of the handle device, said vibrating motor being configured to vibrate warning the user that the temperature measurement has been taken.

In a 70th aspect according to the preceding aspect the vibrating motor is configured to vibrate when the auxiliary selection button is in the retracted position and/or wherein the infrared temperature detector measure a temperature value greater or lower than a predefined threshold.

In a 71st aspect according to any one of the two preceding aspects the vibrating motor is connected to the programmable electronic unit.

In a 72nd aspect according to the preceding aspect the programmable electronic unit is configured to command the vibrating motor to vibrate upon receipt of the confirmation signal emitted by the auxiliary selection button.

In a 73rd aspect according to any one of the preceding aspects the infrared thermometer comprises at least one reading sensor housed within the casing or the housing of the handle device, configured to read a frequency signal by proximity.

In a 74th aspect according to the preceding aspect the reading sensor is configured to retrieve from the frequency signal at least one of the following information:
- the weight of the animal,
- the dimensions of the animal,
- an owner value representative of an array of values including:
    - a name of the owner of the animal,
    - a surname of the owner of the animal,
    - an address of the owner of the animal.

In a 75th aspect according to the preceding aspect the reading sensor defines a data signal as an array of values comprising at least one of the information retrieved by the measured frequency signal.

In a 76th aspect according to any one of the three preceding aspects the reading sensor is connected to the programmable electronic unit and configured to send to the programmable electronic unit the data signal.

In a 77th aspect according to the preceding aspect the programmable control unit is configured to save in the memory unit the data signal received by the reading sensor.

In a 78th aspect according to any one of the five preceding aspects the reading sensor includes at least one RFID reader.

In a 79th aspect according to any one of the preceding aspects the handle device comprises an electrical connection element placed at the upper end portion, configured to provide an electrical connection between the handle device and the casing at least when the casing is engaged to the handle device.

In an 80th aspect according to the preceding the electrical connection element links at least one between, the rechargeable battery of the handle device, the auxiliary selection button and the optical reader of the handle device to at least one between: the programmable electronic unit, the pointing device, the optical reader and the infrared temperature detector embedded in the casing.

In an 81st aspect according to any one of the two preceding aspects the casing includes an electrical connection element defined at the gripping portion and configured to abut against the electrical connection element of the handle device when the casing is engaged to the handle device.

In an 82nd aspect according to any one of the three preceding aspects the electrical connection element of the handle device, together with the electrical connection element of the casing, define a data transfer bus between the handle device and the casing (and optionally a power transfer between the handle device and the casing).

In an 83rd aspect according to any one of the preceding aspects the programmable electronic unit is configured to execute a temperature measuring procedure including the steps of:
  allowing reading the identification code of the patient or the animal,
  measure the temperature of the patient or the animal,
  provide a status value as an array of values including:
    the identification code of the patient or the animal,
    the temperature of the patient or the animal,
    a time value representative of the time instant in which the temperature measurement is taken,
  save a status value in the memory unit.

In an 84th aspect according to the preceding the step of measure the temperature of the patient or the animal comprises the following sub-steps:
  set the programmable electronic unit for performing a temperature measurement of the patient or set the programmable electronic unit for performing a temperature measurement of the animal,
  measure the temperature of the patient or the animal applying a respective correction coefficient.

In an 85th aspect according to any one of the preceding aspects, while measuring the temperature of an animal, the correction coefficient varies according to at least one of the following parameters:
  the size of the animal,
  the size of the eyes of the animal
  the race of the animal,
  the weight of the animal,
  the area of the body of the animal where the temperature is taken.

In an 86th aspect according to any one of the preceding aspects, the programmable electronic unit is configured to execute the step of measuring the temperature of the patient or the animal following receipt of the identification code scanned by the optical reader.

In an 87th aspect according to any one of the preceding aspects, the programmable electronic unit is configured to perform a calibration procedure comprising the steps of:
  measuring the environmental temperature, optionally measuring a surface at the environment temperature to acquire environmental temperature,
  save said environmental temperature replacing the previous environmental temperature saved in the memory unit.

In a 88th aspect is provided an application for an infrared thermometer that when loaded into an infrared thermometer configures the infrared thermometer to perform the following steps:
  set the programmable electronic unit for performing a temperature measurement of the patient or performing a temperature measurement of the animal,
  perform a calibration procedure comprising the steps of:
    measuring the environmental temperature, optionally measuring a surface at the environment temperature to acquire environmental temperature,
    save said environmental temperature in the memory unit,
  measure and display the temperature of the patient or the animal applying a respective correction coefficient.

BRIEF DESCRIPTION OF THE DRAWINGS

The description of embodiments of an infrared thermometer is now provided by way of example.

Such description will be made herein below with reference to the accompanying drawings, provided for indicative purposes only and therefore not limiting, wherein:

FIG. 1 is a plan view of an infrared thermometer, in accordance with a first embodiment;

FIG. 2 is a schematic view of the infrared thermometer represented during a step of detecting the body temperature of an infant inside an incubator;

FIG. 3 is a perspective view of the infrared thermometer, In accordance with a second embodiment;

FIG. 4 is an additional perspective view of the infrared thermometer of FIG. 3;

FIG. 5 is a lateral elevation view of the infrared thermometer, in accordance with a third embodiment, shown in closed condition;

FIG. 6 is a front elevation view of the infrared thermometer of FIG. 5, shown in open condition;

DETAILED DESCRIPTION

Figure 4A:
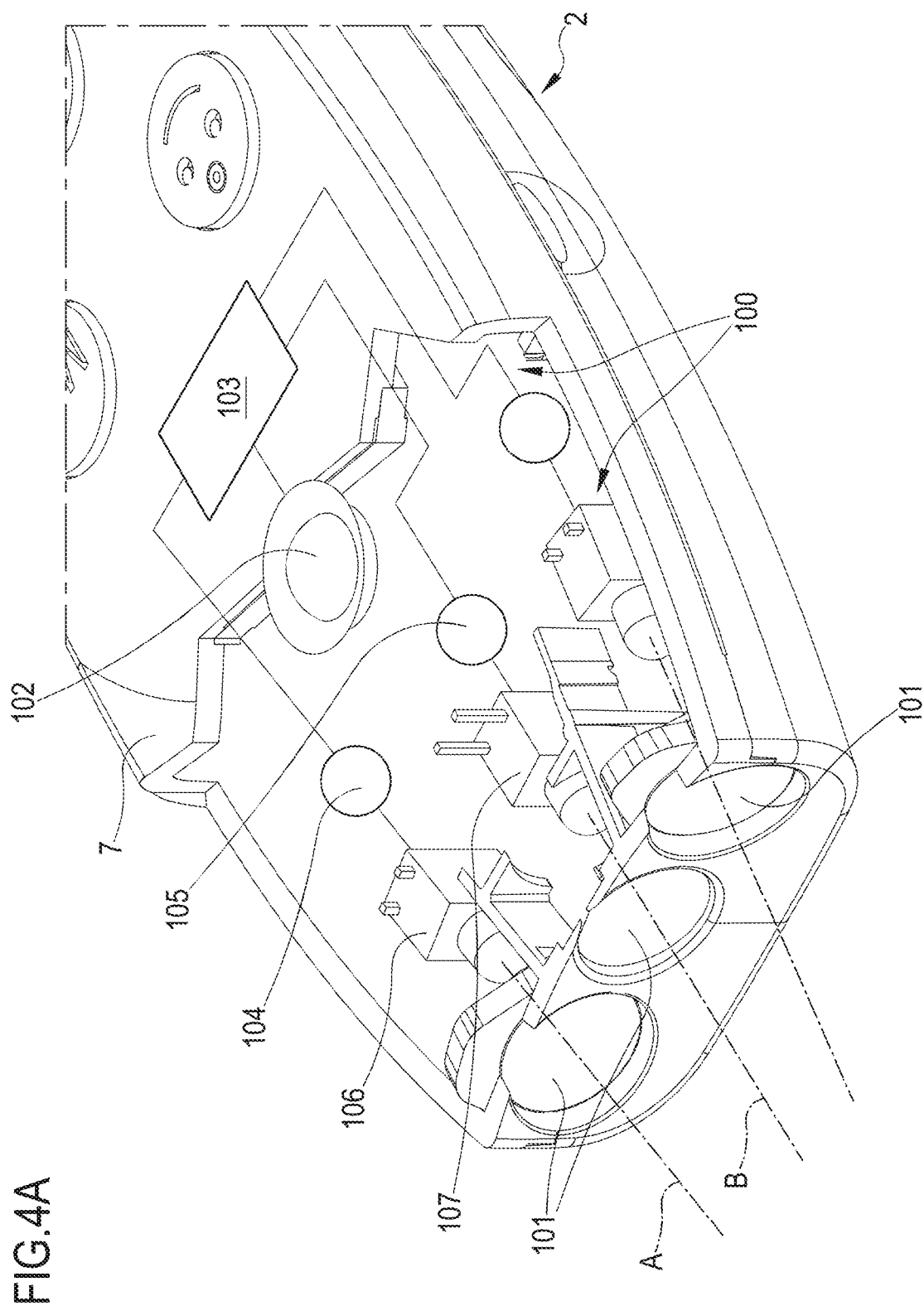
FIG. 4a is a schematic view of the pointing and detection portion of the infrared thermometer of FIG. 4.
Figure 7:
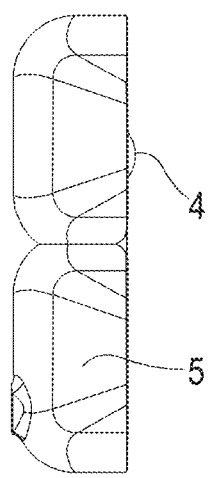
FIG. 7 is a lateral elevation view of the infrared thermometer of FIGS. 5 and 6, shown in the open phase.

With reference to the FIGS. 1 to 4 and 29-31, the numeral 1 designates an infrared thermometer in its entirety.

As is readily apparent in the embodiments shown in the FIGS. 1 to 8 and 29-32, the infrared thermometer 1 comprises a casing 2 having an elongated conformation extending between a front portion where a pointing device is placed and a rear portion. Furthermore, the casing comprises an upper portion including a control portion 3 whereat are arranged one or more pushbutton 4 for selecting different functions and/or for performing different operations, as well as lower portion opposite to the upper portion.

At the side opposite to or below the control portion 3, the casing 2 has a grip portion 5, shaped in such a way as to facilitate the hand grip by a user for the operations of detecting and reading the temperature of a body 6 to be measured, which can be inanimate, such as an object, or living, for example the body of a human being (FIG. 2), or of an animal (FIGS. 47-51).

With reference to the FIGS. 1 to 8 and 29-35, the casing 2 is provided with a pointing and detection portion 7 that has to be oriented in the direction of the body 6 to be measured, so that it is possible to detect its temperature.

The infrared thermometer 1 also comprises at least one pointing device (100—FIG. 4a) operatively arranged in the pointing and detection portion 7 of the casing 2 to emit at least one light beam which can be the numerical representation of the temperature to be known (e.g. the internal temperature of a subject, or the temperature of an object).

In a preferred, but not exclusive embodiment, the pointing device emits two light beams whose projections define, on a respective destination surface 6a (FIG. 2) of the body 6 whose temperature is to be known, respective luminous shapes 8 (FIGS. 2 and 14 to 28).

Advantageously, the pointing device is provided with an optical mechanism (101—FIG. 4a) able to generate the displacement of a luminous shape 8 with respect to the other (FIGS. 20 to 28) following the approach or the removal of the infrared thermometer 1 to/from the destination surface 6a of the body 6 to be measured, between a series of search positions (FIGS. 20, 21, 23, 24, 26 and 27) each relating to a distance that is not suitable for the correct detection of the temperature of the body 6 to be measured and at least one detection position (FIGS. 22, 25 and 28), indicative of an ideal distance for the detection of the temperature of the body to be measured.

In other words, by approaching or removing the thermometer from the body to be measured the relative position of the luminous shape is changed; the luminous shape is formed correctly only when the thermometer is at the correct distance. It should be noted that the two luminous shapes may, for example, consist of the numerical representation of the temperature (the second one —8b) and of a graphic representation (the first one —8a) which is aligned to the representation of the temperature when the thermometer is at the correct distance. The two light beams may also be the representation of a part (for example the upper half or the lower half) of the temperature which is formed into a legible number (with the half-parts perfectly aligned) only when the thermometer is at the right distance.

In an additional example, the two light rays instead are both partial graphic representations that originate a joined representation only when the thermometer is at the correct distance and the temperature constitutes a third light ray which may be independent of the others in the representation of the correct distance.

In an additional variant, the device can emit only one light beam representing the temperature, which is out of focus on the destination surface 6a until the temperature is at the correct distance in which the representation of the temperature is instead focused: in this way, the user can determine (at least approximately) the correct distance of the thermometer for detection of the temperature.

In yet an additional variant, the light beam projects only the temperature, leaving it to the user to determine the correct distance whereat the measurement is to be acquired.

In a further embodiment not shown in the accompanying figures, the pointing device emits a frequency signal (i.e. an ultrasound signal) or an infrared beam, suitable to determine a measuring distance defined between the pointing device and the destination surface. The infrared thermometer 1 further comprises a programmable electronic unit 103 connected to the pointing device and configured to compare the measuring distance to the ideal distance for the detection of the temperature of the body to be measured. As above mentioned, by approaching or removing the thermometer from the destination surface to be measured, the relative position between the pointing device and the destination surface is changed until the measuring distance substantially equals the ideal distance.

The infrared thermometer may include an acoustic emitter arranged within the casing and configured to emit at least one acoustic signal warning the user when the measuring distance equals the ideal distance. The acoustic emitter warns the user, while approaching or removing the thermometer from the destination surface, of the reaching of the ideal measuring distance, so as the temperature of a patient can be correctly measured. Once reached the ideal distance, the temperature of the patient is measured.

The acoustic emitter is also configured to emit an auxiliary acoustic signal, at least partially different from the acoustic signal, warning the user that the temperature measurement has been taken.

Moreover, the acoustic emitter may be configured to emit a further acoustic signal warning the user when the measured temperature of the body to be measured lies outside a predetermined temperature range saved in a memory unit.

The infrared thermometer further comprises a memory unit configured to store data calculated and/or measured by the programmable electronic unit 103. Moreover, the memory unit is selectively removable from the casing (e.g., a USB memory or a memory card), configurable between a first and a second operative condition. In particular, in the first operative condition, the memory unit is housed within the casing and connected to the programmable electronic unit 103. The programmable electronic unit 103 has full access to the data stored within the memory unit, being able to save and retrieve data. In the second operative condition, the memory unit is removed from the casing and unconnected to the programmable electronic unit 103. In other words, the memory unit is a removable device being at least partially housed within the casing in the first operative condition, while being at least partially, optionally completely, removable from the casing in the second operative condition.

Figure 22:
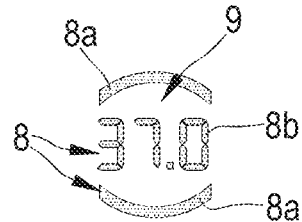
Figure 23:
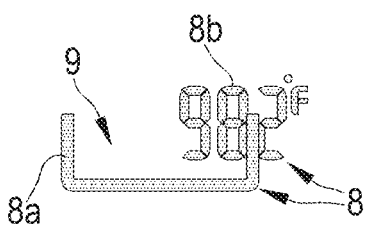
FIGS. 23 to 25 represent respectively two search positions and one detection position visible by means of the second alternative of the projection of the temperature detectable with the infrared thermometer.
Figure 24:
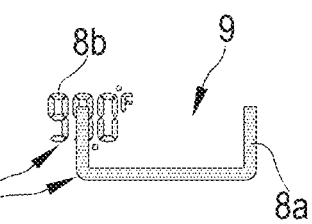
Figure 25:
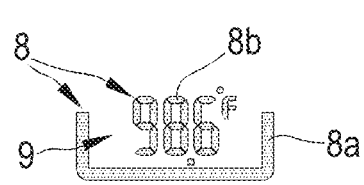
Figure 26:
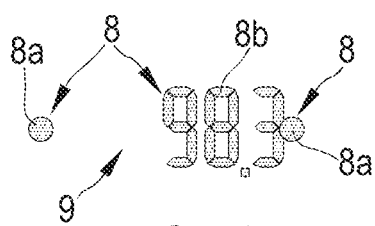
FIGS. 26 to 28 represent respectively two search positions and one detection position visible by means of the third alternative of the projection of the temperature detectable with the infrared thermometer.
Figure 27:
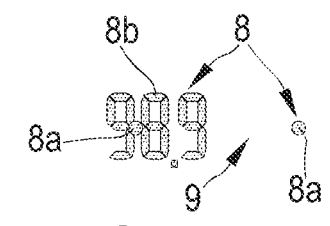
Figure 28:
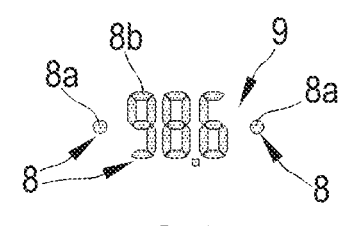

The infrared thermometer 1 further comprises at least one infrared device (102—FIG. 4*a*) for detecting the temperature, operatively arranged at the pointing and detection portion 7 of the casing 2 and configured to detect an infrared radiation coming from the destination surface 6*a* of the body 6 to be measured, specifically (but not necessarily only) when the luminous shapes 8 defined by the projection of the light beams on said destination surface 6 are in the detection position (FIGS. 22, 25 and 28).

The detection device optionally comprises a waveguide adapted to direct the infrared rays coming from the region of interest of the body on an infrared sensor. Descending further into detail, the programmable electronic unit (103—FIG. 4*a*) is positioned inside the casing 2 and connected at least to the infrared detection device to calculate the real or active temperature of the body as a function of the detected infrared radiation and of a correction factor. the correction factor may be a constant factor or a fixed factor based on the measured infrared radiations. However, a reasonable choice for the correction factor is the ambient temperature.

In detail, since the detection device is able to measure the temperature of the body 6 at the destination surface 6*a* thereof, the programmable electronic unit calculates its real temperature on the basis of the temperature detected at the destination surface 6*a*, of the ambient temperature and of suitable predetermined coefficients. Describing in further detail the structure and the operation of the infrared thermometer 1, at least one of the light beams emitted by the pointing device projects (FIGS. 2 and 14 to 28) the temperature calculated by the programmable electronic unit on the destination surface 6*a* of the body 6 to be measured.

The thermometer always measures and project the temperature following activation, i.e. even when the distance is not the correct one. It is the operator who, releasing the activation pushbutton at the right time, determines the final measurement.

Obviously, it will also be possible for the projection of the temperature to be substantially prevented (for example by a control unit) until the thermometer is at the correct distance (or within a small interval around it).

In an additional embodiment, it is also possible for the temperature to be projected even when the distance is not the correct one, but the temperature value is locked (and stored) when the distance is the correct one for which the thermometer has been calibrated. In this case, the correct distance can be identified by optical triangulation, ultrasound, capacitive, proximity system, by infrared or by other technique, and completion of the detection can be signaled by an optical system (for example, flashing of the projected value or of the reference shape 8*a*) or by an acoustic indication.

In detail, the correct distance may be determined projecting an infrared or LED beam towards the surface of the body to be measured. In this case, the infrared beam hits the surface of the body to be measured and it is reflected at least towards a direction pointing to the pointing device. The programmable electronic unit, which is connected to the pointing device, measures the time interval occurring between the time instant wherein the infrared beam is generated and the time instant wherein the reflected infrared beam is detected by the pointing device. By means of such calculation, the distance occurring between the infrared thermometer and the body to be measured is determined.

Advantageously, the optical mechanism of the pointing device is configured so that the luminous shapes 8 defined by the light beams emitted by the pointing device have, in the search positions (FIGS. 20, 21, 23, 24, 26 and 27), an offset detectable along at least one reference direction and, in the detection position (FIGS. 2, 22, 25 and 28), an alignment detectable along said reference direction.

In detail, it is preferable that a first light beam (A in FIG. 4*a*) emitted by the pointing device defines, on the destination surface 6*a* of the body 6 to be measured, a first luminous shape 8*a* delimiting a respective convergence area 9, while a second light beam (B in FIG. 4*a*) also emitted by the pointing device defines, on the same destination surface 6*a* of the body 6 to be measured, a second luminous shape 8*b*.

In detail, the pointing device comprises a first light emitter (104—FIG. 4*a*), preferably a LED, to emit the first light beam A and to define the first luminous shape 8*a* and a second light emitter (105—FIG. 4*a*), preferably a LED, to emit the second light beam B and to define the second luminous shape 8*b*.

The alignment of the first 8*a* and of the second luminous shape 8*b*, which corresponds to the detection position (FIGS. 2, 22, 25 and 28), of the infrared thermometer 1, is detectable when the second luminous shape 8*b* is within the convergence area 9 delimited by the first luminous shape 8*a*.

When the second luminous shape 8*b* is within the convergence area 9 (FIGS. 2, 22, 25 and 28) defined by the first luminous shape 8*a*, the second luminous shape 8*b* indicates the temperature of the body 6 calculated by the programmable electronic unit.

In detail, the optical mechanism of the pointing device comprises one or more lenses arranged at the pointing and detection portion 7 of the infrared thermometer 1. These lenses are configured so as to align the luminous shapes 8 in the detection position (FIGS. 2, 22, 25 and 28) when the infrared thermometer 1 is at the ideal distance for detection of the temperature of the body 6 to be measured.

Advantageously, at least one lens of the optical mechanism is of the biconvex type so that it is able to concentrate and focus the light coming from the pointing device at a predetermined distance.

According to an aspect, the infrared thermometer 1 comprises at least one shutter element (106—FIG. 4*a*) arranged at the pointing and detection portion 7 to give a predetermined shape to the first luminous shape 8*a* defined by the first light beam emitted by the pointing device.

In detail, the shutter element 106 is positioned in the pointing and detection portion 7 of the casing 2 so as to remain interposed between the pointing device and the destination surface 6*a* of the body 6 to be measured.

Figure 17:
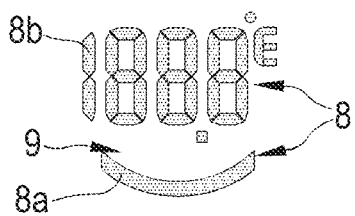
FIG. 17 is a fourth alternative of the projection of the temperature detectable by the infrared thermometer.

The shutter element can comprise at least one plate (not shown) which has at least one through opening (not shown) having the shape to be given to the first luminous shape 8*a* projected on the destination surface 6*a* of the body 6 to be measured. The through opening of the plate of the shutter element is, at least partially, preferably completely, impacted by the first light beam emitted by the pointing device of the infrared thermometer so that the shape of the first luminous shape 8*a* is defined on the destination surface 6*a* of the body 6 to be measured. Alternatively to the plate, the shutter element may be defined, in the pointing and detection portion 7, by the structure of the casing 2 itself. In this case too, the shutter element has at least one through opening having the shape to be given to the first luminous shape 8a projected or to be projected on the destination surface 6a of the body 6 to be measured. Similarly to the operation of the shutter element provided with the plate, the shutter element that lacks the plate is impacted by the respective light beam to project the first luminous shape 8a on the destination surface 6a of the body 6. As shown in FIG. 17, the through opening of the shutter element has a shape that gives the form of a single arc to the first luminous shape. In this case, the convergence area 9 is at least partially delimited by said arc.

With reference instead to FIGS. 2, 14 and 20 to 22, the through opening of the shutter element has a shape that gives the form of at least two arcs with opposite concavities to the first luminous shape 8a. According to this configuration, the convergence area 9 is at least in part delimited between said arcs.

As shown in FIGS. 15 and 23 to 25, the through opening of the shutter element has a shape that gives to the first luminous shape 8a the form of a polygonal chain that presents a central segment from whose ends extend perpendicularly two respective lateral segments to draw a semi-rectangle. In this case, the convergence area is at least partly delimited inside the segments of the polygonal chain.

Figure 18:
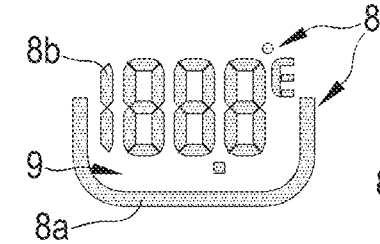
FIG. 18 is a fifth alternative of the projection of the temperature detectable by the infrared thermometer.

As shown in FIG. 18, the through opening of the shutter element has a shape that gives the form of a laid-down "C" to the first luminous shape 8a. In this case, the convergence area 9 is delimited at least in part by the laid-down "C" luminous shape 8a.

As shown in FIGS. 16 and 26 to 28, the through opening of the shutter element has a shape that gives the form of two mutually distanced points to the first luminous shape 8a. The convergence area 9 is at least partly delimited between said points.

Figure 19:
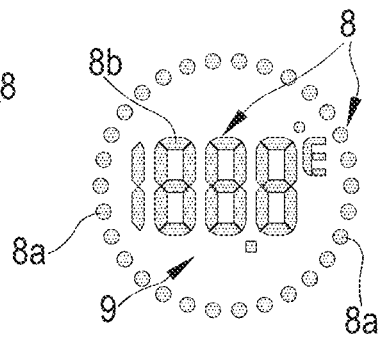
FIG. 19 is a sixth alternative of the projection of the temperature detectable by the infrared thermometer.
Figure 20:
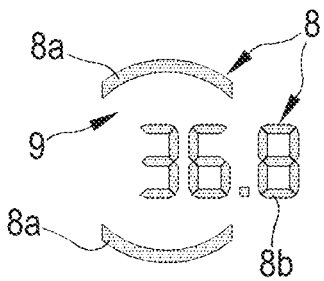
FIGS. 20 to 22 represent respectively two search positions and one detection position visible by means of the first alternative of the projection of the temperature detectable with the infrared thermometer.
Figure 21:
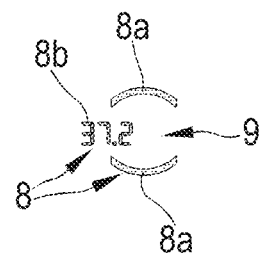

Alternatively, as shown in FIG. 19, the through opening of the shutter element has a shape that gives to the first luminous shape 8a the form of a circle, preferably defined by a plurality of distributed points, optionally equidistant on a respective circumference. In this case, the convergence area is at least partly delimited by said circle or by the plurality of points. It should be noted that both a circumference originated by a series of point and a complete circle is possible, for example acting on the lens to distribute light in such a way as to fill the holes present in the shutter.

In a further embodiment of the present invention, a secondary light beam may be emitted by the pointing device defining, on the destination surface 6a of the body 6 to be measured, a secondary luminous shape 8c. The pointing device may comprise a secondary light emitter, preferably a LED, to emit the secondary light beam and to define the secondary luminous shape 8c. In detail, in this latter embodiment, the alignment of the first 8a and of the secondary luminous shape 8c, which corresponds to the detection position (FIGS. 42 and 45), of the infrared thermometer 1, is detectable when the secondary luminous shape 8c is within the convergence area 9 delimited by the first luminous shape 8a.

When the secondary luminous shape 8c is within the convergence area 9 (FIGS. 42 and 45) defined by the first luminous shape 8a, the temperature of the body is taken and calculated by the programmable electronic unit. The infrared thermometer may also comprise an auxiliary shutter element, identical to the shutter element 106, giving a predetermined shape to the secondary luminous shape 8c defined by the secondary light beam emitted by the pointing device.

As shown in FIGS. 40-45, the through opening of the auxiliary shutter element has a shape that gives the form of at least two arcs with opposite concavities. In this configuration, the first and secondary luminous shapes 8a, 8c defines substantially a circle (FIG. 42) when the secondary luminous shape 8c is within the convergence area defined by the first luminous shape 8a.

Figure 43:
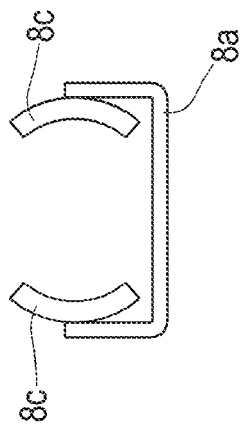
Figure 44:
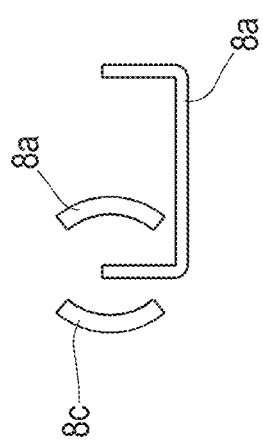
Figure 45:
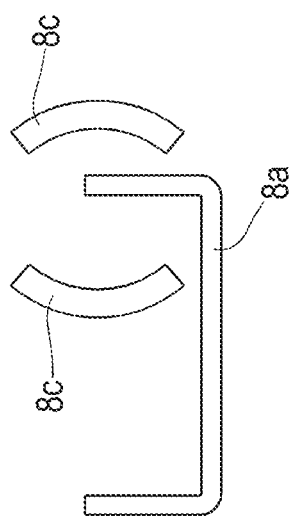

In FIGS. 43-45, the first luminous shape is shown in the form of a polygonal chain that presents a central segment from whose ends extend perpendicularly two respective lateral segments to draw a semi-rectangle. In this case, the temperature is taken wherein the secondary luminous shape 8c lies within the convergence area delimited by the segments of the polygonal chain.

It is worth noting that, when the secondary luminous shape 8c is within the convergence area (FIGS. 42, 45) defined by the first luminous shape 8a, the temperature of the body 6 is measured/calculated by the programmable electronic unit, but the value of the measured temperature may not shown by the second luminous shape 8b.

Moreover, in an embodiment not shown in the accompanying figures, only the second luminous shape showing the temperature measured by the programmable electronic unit may be projected. In such embodiment, the determination of the optimal distance occurring between the pointing device and the surface of the body to be measured may be determined using an infrared or LED beam as described above.

Advantageously, the infrared thermometer 1 further comprises at least one negative display (107—FIG. 4a) arranged in the pointing and detection portion 7 of the casing 2 so as to remain interposed between the pointing device and the destination surface 6a of the body 6 to be measured so as to be impacted, at least partially, preferably completely by the second light beam emitted by the pointing device which is tasked with defining the second luminous shape 8b.

In particular, the negative display gives a variable form to the second luminous shape 8b defined by the second light ray emitted by the pointing device.

Advantageously, in an embodiment, the form of the second luminous shape 8b corresponds to a predetermined symbol, for example a plurality of dots, indicative of the search positions, i.e. of the positions of non-detection of the temperature, and corresponding to the temperature of the body 6 to be measured calculated by the programmable electronic unit.

The change of the form of the second luminous shape 8b is managed automatically by the programmable electronic unit which intervenes on the negative display to project on the destination surface 6a of the body 6 to be measured the aforementioned symbol or the calculated temperature. Alternatively, as mentioned, the thermometer (once activated) always projects the temperature and it is the user who establishes when to make the detection on the patient (for example exploiting the system for pointing and determining the correct distance or when the acoustic emitter plays an acoustic signal warning the user of reaching the ideal distance for taking the temperature measurement).

Descending further in detail, the infrared temperature detection device comprises at least one infrared ray sensor configured to detect the electromagnetic radiation emitted by the destination surface 6a of the body 6 to be measured included in the infrared frequency band.

In addition, the infrared detection device comprises at least one waveguide, arranged at the pointing and detection portion 7 so as to be interposed between the detection device and the destination surface 6a of the body 6 to be measured.

The waveguide conveys the electromagnetic waves emitted by the destination surface 6a of the body 6 to be measured towards the infrared sensor so that it can carry out a correct measurement of the temperature of the body 6 on the destination surface.

In accordance with an additional embodiment, the pointing device is configured in such a way as to use the negative display to project on an inner surface of the casing 2 of the infrared thermometer 1, the temperature of the body 6 to be measured, calculated by the programmable electronic unit (see FIGS. 29-32).

Figure 32:
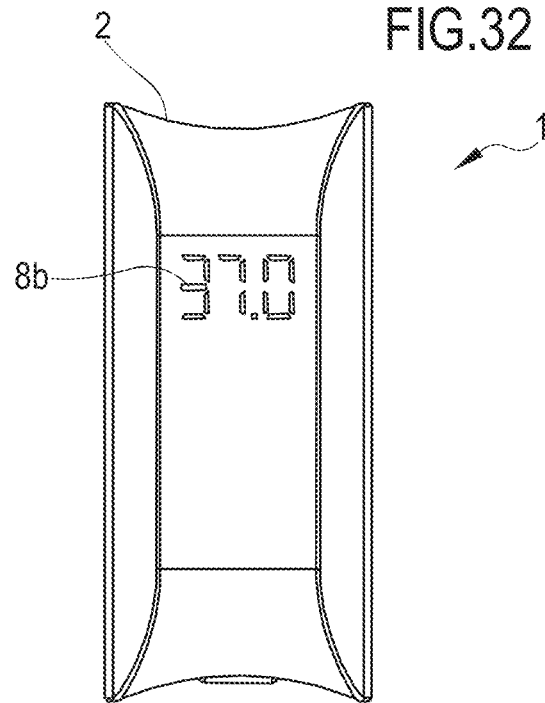

In this case, the portion of the casing 2 corresponding to the internal surface on which the temperature is projected is configured and constructed in such a way as to allow the traversing of the respective light beam and thereby enable the temperature of the body 6 to be measured to be displayed from the outside (FIG. 32).

In particular, the portion of casing 2 corresponding to the inner surface on which the temperature is projected the temperature is partially transparent (translucent) or opalescent.

In one example, the portion of casing 2 corresponding to the inner surface on which the temperature is projected is thin, preferably having a thickness between 0.5 millimeters and 0.8 millimeters and in particular it is made of plastic such as polycarbonate, ABS, nylon, polypropylene, etc. (semi-transparence can be given by the low thickness, or by the characteristics of the material, for example opalescent material).

To project the temperature of the body 6 to be measured inside the casing 2 of the infrared thermometer 1, the pointing device may or may not comprise an auxiliary light emitter, preferably a LED, configured to emit an auxiliary light beam towards the negative display and to project on the inner surface of the casing 2 the temperature calculated by the programmable electronic unit. In fact, even in the position with the apparatus closed, the same LED can illuminate the negative display to generate the projection inside the casing (see FIGS. 30 and 32).

In accordance with one aspect, the negative display is a liquid crystal display whose blackened (not lighted) pixels do not allow the passage of light, while the activated pixels allow light to transit through their screen.

In accordance with another embodiment solution illustrated in FIGS. 1, 3, 4 and 6, the infrared thermometer 1 comprises at least one auxiliary display 10 for an additional display of the temperature of the body 6 to be measured, calculated by the programmable electronic unit. The auxiliary display 10 is engaged with the casing 2 of the infrared thermometer 1 so as to be immediately viewable from the exterior.

Advantageously, the auxiliary display 10 is a liquid crystal display, preferably, but not necessarily, backlit.

Alternatively, the auxiliary display 10 can provide a LED display.

Alternatively to the external position of the auxiliary display 10 it is possible to position the auxiliary display inside the casing 2 in proximity or in direct contact with an inner surface thereof configured in such a way as to allow external viewing of the temperature of the body to be measured, calculated by the programmable electronic unit.

In this case, too, similarly to the configuration provided for the inner projection of the temperature by the pointing device, the portion of the casing 2 relating to the inner surface corresponding to the auxiliary 10 is at least in part semi-transparent or opalescent, or otherwise has very small thickness.

In detail, this portion of the casing 2 has sufficient thickness to allow the passage of light from the interior to the exterior of the casing 2.

Indicatively, the thickness provided to allow the light of the auxiliary display 11 to traverse the casing 2 is between 0.5 millimeters and 0.8 millimeters.

It should be noted that the presence of the display 10 may be optional when the temperature is projected. For example, the device of FIGS. 3 and 4 can lack said display in order to reduce and optimize costs.

In accordance with one aspect, the infrared thermometer 1 and, therefore, the programmable electronic unit are configured so as to maintain the projection of the temperature of the body 6 to be measured for a period of time that is sufficient for it to be displayed and read. Advantageously, the projection of the temperature of the body 6 to be measured calculated by the programmable electronic unit is maintained for a period of time between 2 and 30 seconds, preferably between 5 and 20 seconds, still more preferably corresponding to approximately 10 seconds.

Figure 8:
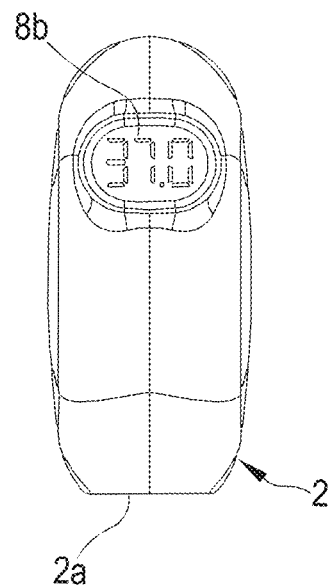
FIG. 8 is a front elevation view of the infrared thermometer of FIGS. 5 to 7, shown in closed condition.
Figure 9:
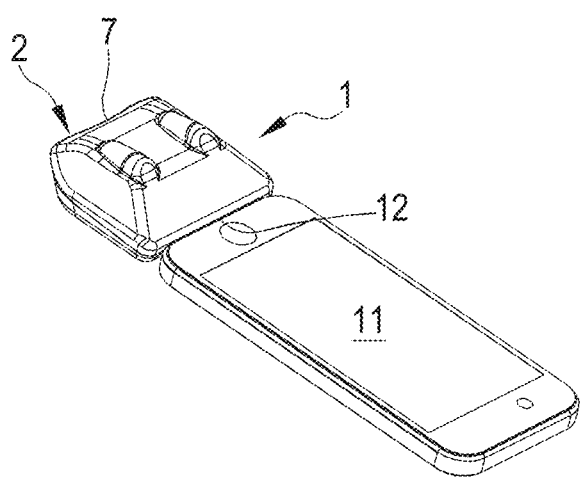
FIG. 9 is a perspective view of the infrared thermometer, in accordance with a fourth embodiment, shown in connection with an electronic device.
Figure 10:
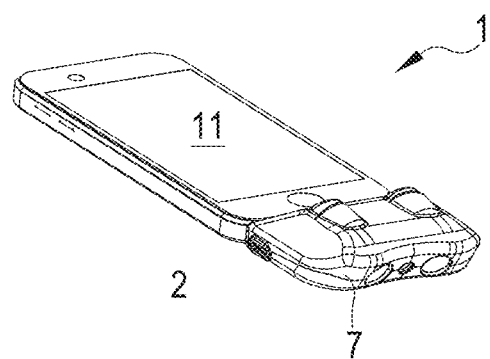
FIG. 10 is an additional perspective view of the infrared thermometer of FIG. 9.
Figure 11:
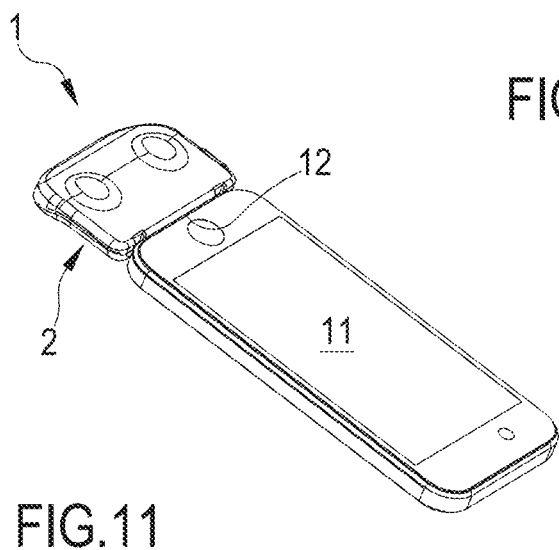
FIG. 11 is a perspective view of the infrared thermometer, in accordance with a fifth embodiment, shown in connection with an electronic device.
Figure 12:
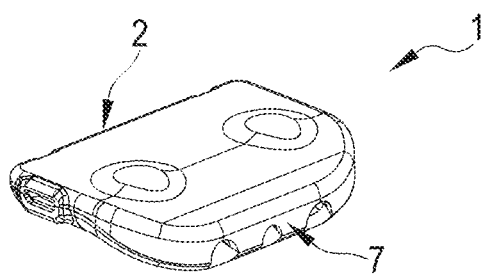
FIG. 12 is a perspective view of the infrared thermometer of FIG. 11, disconnected from the electronic device.
Figure 13:
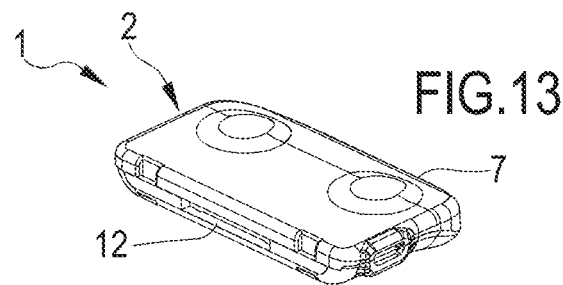
FIG. 13 is an additional perspective view of the infrared thermometer of FIG. 12.
Figure 14:
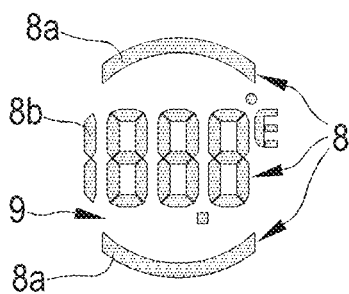
FIG. 14 is a first alternative of the projection of the temperature detectable by the infrared thermometer.
Figure 15:
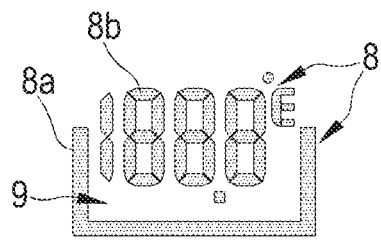
FIG. 15 is a second alternative of the projection of the temperature detectable by the infrared thermometer.
Figure 16:
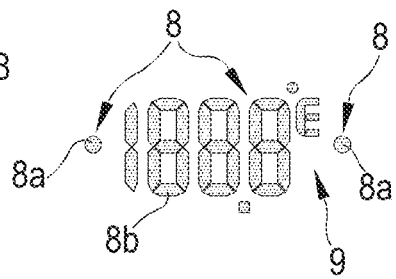
FIG. 16 is a third alternative of the projection of the temperature detectable by the infrared thermometer.
Figure 29:
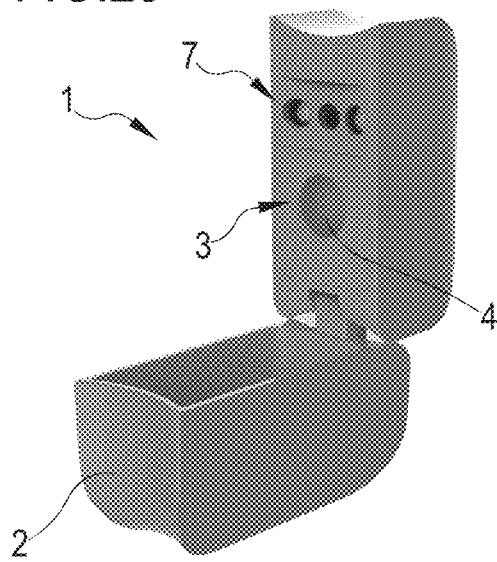
FIGS. 29-32 represent an additional embodiment of an infrared thermometer.
Figure 30:
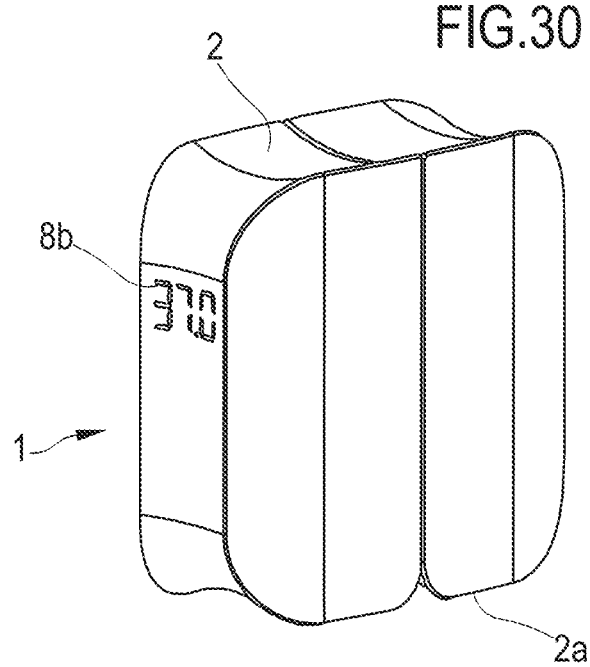
Figure 31:
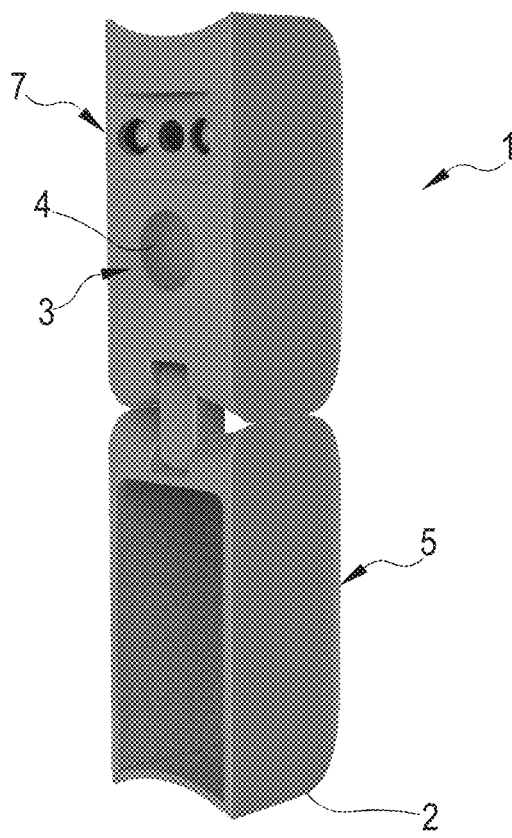

In accordance with an additional embodiment, shown in the FIGS. 5 to 8 and 29-32, the casing 2 of the infrared thermometer 1 can be folded between a closed condition (FIG. 8; FIGS. 30, 32) in which the pointing and detection portion 7 and the control portion 3 are enclosed by the casing itself and an open condition (FIGS. 5 to 7; FIGS. 29, 31) in which the pointing and detection portion 7 and the control portion are not enclosed by the casing 2 being therefore accessible from the exterior.

As shown in FIGS. 7 and 8 and 29, 31, when the casing 2 is in the open condition it can present a substantially pistol-like conformation with an ergonomic grip portion 5 to facilitate the grip by a user.

With reference instead to FIGS. 8 and 30, the casing 2 advantageously has a support surface 2a sufficiently large for the infrared thermometer 1 to be able to remain in an erect and stable position when it is in the closed condition.

In addition, the infrared thermometer 1 is configured so as to maintain in projection the temperature of the body 6 to be measured calculated by the programmable electronic unit when the casing 2 is switched from the open condition (FIGS. 5 and 6; 29) to the closed condition (FIG. 8; 32). In this situation, the programmable electronic unit perceives, by means of at least one sensor or a similar detector, the closing of the casing 2 which determines the projection of the temperature on an inner surface of the casing 2.

To allow a correct reading of the calculated temperature from the exterior, when the programmable electronic unit perceives the closing of the casing 2, acts on the negative display so as to turn upside down the projection of the temperature on the inner surface of the closed casing 2 so that the temperature can easily be read from the exterior.

Naturally, to allow light to pass through the casing 2, the portion dedicated to the projection of the temperature must have the same structure characteristics of transparency and/or thickness mentioned above in relation to the other embodiments.

In an additional improvement, in particular, though not exclusively, of what is shown in FIGS. 29-32, the device 1 may also provide the projection of the ambient temperature. In an additional variant, the device may be able to project the time as well. In other words, when the thermometer is not in use, it can be transformed into a clock representing on the outer casing the time and/or the date and/or the ambient temperature, which may alternate.

In an additional variant, the apparatus can also be only a clock that projects the image from the interior on the outer casing.

The infrared thermometer further comprises a source of electric power supply, preferably one or more batteries. In particular, the infrared thermometer includes at least one energy accumulator 112 connected to the programmable electronic unit 103, the pointing device, the optical reader and the infrared temperature detector. The energy accumulator 112 is completely housed within the casing and it is configured to supply power to each electronic component of the infrared thermometer. In particular, the energy accumulator 112 include a rechargeable battery housed within the casing at the gripping portion. The programmable electronic unit 103 is connected to the rechargeable battery and configured to measure a voltage of the rechargeable battery representative of a residual state of charge of the battery. The programmable electronic unit, following the measurement of the voltage representative of the residual state of charge of the rechargeable battery, is configured to calculate a state of charge value as the ratio between the measured voltage, representative of the residual state of charge of the battery, and the maximum voltage that can be supplied by the battery. The programmable electronic unit 103 thus allows to measure the residual charge of the rechargeable battery. Particularly, the programmable electronic unit 103 is further configured to determine a low state of charge of the rechargeable battery when the state of charge value is at least comprised between 0 and 0.2.

The auxiliary display is configured to display the state of charge value calculated by the programmable electronic unit 103 when the state of charge value is at least comprised between 0 and 0.2, warning the user of a lower charge of the battery.

The infrared thermometer can also include an induction coil 120 housed within the casing at the gripping portion, in interposition between the energy accumulator 112 and an outer wall of the casing. The induction coil 120 is connected to the energy accumulator and configured to wirelessly transfer energy from an external power supply to the energy accumulator 112. The induction coil 120 uses electromagnetic induction to provide electricity to the rechargeable battery in order to charge it.

In accordance with the embodiments shown in FIGS. 9 to 13, the infrared thermometer 1 is a simplified version of the embodiments described above, which operate in association with an electronic device 11, for example a smartphone, a tablet, a computer and/or similar devices provided with a programmable electronic unit and with a software or with an application dedicated to the management of the infrared thermometer 1.

In detail, the infrared thermometer 1 represented in the FIGS. 9 to 13 comprises a casing 2 provided with a pointing and detection portion 7. In this case, the infrared thermometer 1 comprises a pointing device operatively arranged in the pointing and detection portion 7 of the casing 2 to emit at least one light beam whose project defines, on a respective destination surface 6a of a body 6 whose temperature is to be known, at least one luminous shape (preferably but not necessarily consisting of the detected temperature). As described previously, it will be possible to have at least two light beams to generate at least two respective luminous shapes. The pointing device is also provided with an optical mechanism able to determine the displacement of one luminous shape with respect to the other as a result of the approach or of the removal of the thermometer to/from the destination surface 6a of the body 6 to be measured between a series of search positions each relating to an unsuitable distance for the correct detection of the temperature of the body 6 to be measured and at least one detection position that is indicative of an ideal distance for the detection of the temperature of the body 6 to be measured.

The thermometer also comprises an infrared device for detecting the temperature, operatively arranged at the pointing and detection portion 7 of the casing 2.

The infrared detection device is configured to detect the temperature of the destination surface 6a of the body 6 in particular (but not exclusively) when the shapes 8 defined by the projection of the light beams on said destination surface 6a are in the detection position. Advantageously, the infrared thermometer comprises at least one connection interface 12 for connection to an electronic device 11 provided with at least one programmable electronic unit configured (for example by means of an appropriate downloadable and installable app) to calculate the real temperature of the body to be measured on the basis of the temperature detected at the destination surface 6a thereof, of the ambient temperature and of suitable predetermined coefficients relating to the type of body to be measured.

Alternatively, the temperature is calculated by the infrared detection device itself, while the electronic device 11 (such as the smartphone) is used as a source of energy, to display the temperature and possibly other information and to transmit info for example to the medical file by means of Bluetooth or wireless.

In this case, too, at least one of the light beams emitted by the pointing device projects on the destination surface 6a of the body 6 to be measured the temperature calculated by the programmable electronic unit of the electronic device 11 or by the thermometer 11 when the shapes defined on the destination surface 6a of the body 6 by the respective light beams are in the detection position.

In accordance with an embodiment variant of the infrared thermometer 1 able to be associated to the electronic management and power supply devices, the optical mechanism of the pointing device is configured so that the luminous shapes defined by the light beams emitted by the pointing device have, in the search positions, an offset (FIGS. 20, 21, 23, 24, 26, 27, 40, 41, 43 and 44) detectable along at least one reference direction and, in the detection position, an alignment (FIGS. 2, 14 to 19, 22, 25, 28, 42 and 45) detectable along said reference direction.

Figure 42:
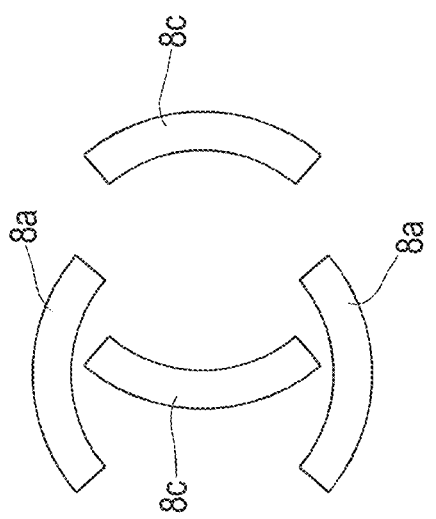

Similarly to the other embodiments described above, a first light beam emitted by the pointing device defines, on the destination surface 6a of the body 6 to be measured, a first luminous shape 8a which delimits a respective convergence area 9, while a second light beam or a secondary light beam emitted by the pointing device defines, on the destination surface 6a of the body 6 to be measured, respectively a second luminous shape 8b or a secondary luminous shape 8c. The alignment of the first 8a with at least one of the second luminous shape 8b and the secondary luminous shape 8c, corresponding to the detection position of the infrared thermometer 1, is detectable when the second luminous shape 8b or the secondary luminous shape 8c is within the convergence area 9 delimited by the first luminous shape 8a. In this situation, only the second luminous shape 8b indicates the temperature of the body 6 calculated by the programmable electronic unit, while the secondary luminous shape may show two arcs having opposite concavities (FIGS. 42 and 45).

In this case, too, the optical mechanism of the pointing device comprises one or more lenses arranged at the pointing and detection portion 7 of the infrared thermometer 1.

These lenses are configured so as to align the luminous shape 8a with the second luminous shape 8b or the secondary luminous shape 8c in the detection position when the infrared thermometer 1 is at the ideal distance for detection of the temperature of the body 6 to be measured.

The infrared thermometer 1 comprises, for the embodiments described above, a shutter element arranged at the pointing and detection portion to give to the first luminous shape 8a defined by the first light beam emitted by the pointing device a predetermined shape, for example those shown in the FIGS. 2 and 14 to 28. Moreover, the infrared thermometer may include an auxiliary shutter element, identical to the shutter element, giving to the secondary luminous shape 8c defined by the secondary light beam emitted by the pointing device a predetermined shape, for example those shown in the FIGS. 40 to 45.

In accordance with an alternative embodiment of the infrared thermometer 1 that can be associated to an electronic device 11 for managing and supplying power to the optical mechanism of the pointing device is configured so that at least two luminous shapes 8 defined by the light beams emitted by the pointing device diverge or are distanced from each other, in the search positions, and converge or coincide, in the detection position. In this situation, a first light beam emitted by the pointing device defines, on the destination surface 6a of the body 6 to be measured, at least two first luminous shapes, while a second light beam emitted by the pointing device defines, on the destination surface 6a of the body 6 to be measured, a second luminous shape.

The convergence or coincidence of the first luminous shapes corresponding to the position of detection of the infrared thermometer 1 indicates the correct distance for the detection and the calculation of the real temperature of the body 6 is performed. In particular, in an embodiment of the invention, the calculated temperature is displayed by means of the second luminous shape 8b. The infrared thermometer 1 able to be associated with a management and power supply electronic device 11, lastly, comprises a series of components already provided in the embodiments described above, for example the negative display, the infrared sensor, the waveguide.

Since such versions of infrared thermometers are particularly simplified to be used in association with other electronic management and power supply devices 11, they do not provide any auxiliary display for viewing the calculated temperatures.

Moreover, these simplified infrared thermometers can also lack power supply systems because they are supplied power by the electronic device 11 to which they are associated and they can lack electronic programmable electronic units, since they are already provided in the aforementioned electronic devices 11.

In a further embodiment of the present invention shown in FIGS. 33-36, the infrared thermometer comprises an optical reader 110 at least partially housed within the casing at the gripping portion and configured to allow reading an identification code of a patient whose temperature is measured by the infrared thermometer. In other words, the optical reader scans an identification code of the patient in order to associate the measured temperature to a patient. The identification code differs for each patient allowing to uniquely identify each patient. The identification code may be printed on a patient wearable, such as a bracelet as common in hospitals, or may be placed on a patient card, such as a health card from the Sanitary System.

Moreover, the identification code may also identify an animal whose temperature is measured by the infrared thermometer. The optical reader 110 scans an identification code of the animal in order to identify the animal whose temperature has to be measured. The identification code may be printed on a tag attached to the animal, for example a user may measure the temperature of a cow reading the identification tag attached to its hear. Following reading the identification code, the user measures the temperature of the animal. In detail, the optical reader comprises at least one laser beam generator configured to emit at least one laser beam towards the identification code to be detected. In an alternative form, the optical reader comprises a LED emitter configured to emit at least one light beam towards the identification code to be detected. The identification code may be a QR code or a barcode and the optical reader being a QR code or a barcode reader.

The optical reader is also connected to the programmable electronic unit and configured to send the identification code to the programmable electronic unit which associates it to the measured temperature of the patient or the animal. In particular, the programmable electronic unit is configured to execute a temperature measuring procedure including the steps of:

reading the identification code of the patient or the animal,
measure the temperature of the patient or the animal,
determine a status value as an array of values including:
  the identification code of the patient or the animal,
  the temperature of the patient or the animal,
  a time value representative of the time instant in which the temperature measurement is taken,
save a status value in the memory unit.

In other words, the status value links the identification code of the patient or the animal together with the measured temperature and the time instant in which the temperature measurement is taken.

It is worth noting that before performing a temperature measurement of a patient (human being) or an animal, the user has to set the programmable electronic unit for performing a temperature measurement of the patient or performing a temperature measurement of the animal. Therefore, the user, by means of a pushbutton 4 or by means of an application installable on the infrared thermometer, sets a correction coefficient varying according to at least one of the following parameters:

the size of the animal, the size of the eyes of the animal,
the area of the body of the animal where the temperature measurement is taken (for example eyes, auricle, rectal area, gum, chest),
the race of the animal,
the weight of the animal.

Figure 51:
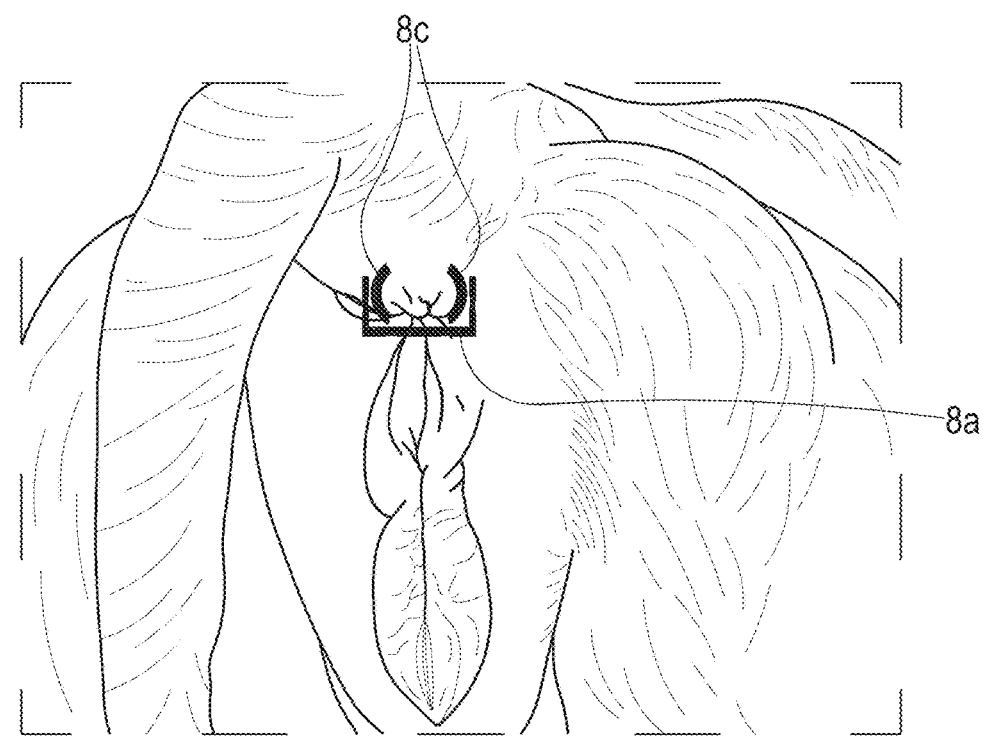

In particular, a plurality of correction coefficient are stored in the memory unit, thus a user, before performing the temperature measurement, has to select the race of the animal which the temperature measurement is taken (for example a dog, a cat or a horse). Moreover, since the internal temperature of two animals belonging to the same race but having different size may differ, a user, before performing the temperature measurement, has to select a specific correction coefficient also taking into account the size of the animal or the area where the temperature measurement is taken. In particular, the correction coefficient may vary with respect to the area of the body of the animal where the temperature is taken. Indeed, as shown in FIGS. 47-51, the user may perform a temperature measurement on an animal pointing the pointing device (namely projecting the first luminous shape, the second luminous shape or the secondary luminous shape) towards the eye the animal (FIGS. 47-48), the gum of the animal (FIG. 49), the ear of the animal (50)

or the rectum of the animal (FIG. 51). Moreover, before performing a temperature measurement, the programmable electronic unit is configured to perform a calibration procedure comprising the steps of:

measuring the environmental temperature, optionally measuring a surface at the environmental temperature to use as the environment temperature, save said environmental temperature replacing the previous environmental temperature saved in the memory unit.

The calibration procedure thus allows to set a new reference temperature for performing a correct calculation of the temperature of the animal or the patient, which is namely the environmental temperature (i.e. a floor or a wall of the environment).

In this embodiment, the gripping portion of the casing exclusively shows at least one engagement portion 170 configured to receive in engagement a constraining portion of the handle device 160.

The casing further includes a selection button 116 at the control portion connected to the programmable electronic unit and configured to send at least one selected between:

a confirmation signal representative of a correct temperature measurement taken by the user, a discard signal representative of a wrong temperature measurement taken by the user.

Following reaching the ideal distance between the pointing device and the surface to be measured, the user can confirm the measured temperature, assuring that the data is correct, as well as discarding the temperature measure, for example if the measured temperature does not belong the patient whose identification code has been scanned.

The programmable electronic unit is therefore configured to save the measured temperature in the memory unit following receipt of the confirmation signal by the selection button 116. Moreover, the programmable electronic unit, following receipt of the discard signal by the selection button, is configured to discard the measured temperature of the patient and re-execute the step of measure the temperature of the patient.

It is worth noting that the programmable electronic unit is configured to measure and save a plurality of temperature measurements belonging to the same patient, namely having the same identification code. The programmable electronic unit thus records in the memory unit a plurality of status values belonging to the same patient, allowing to determine a history of the temperatures measured at a given patient.

Figure 33:
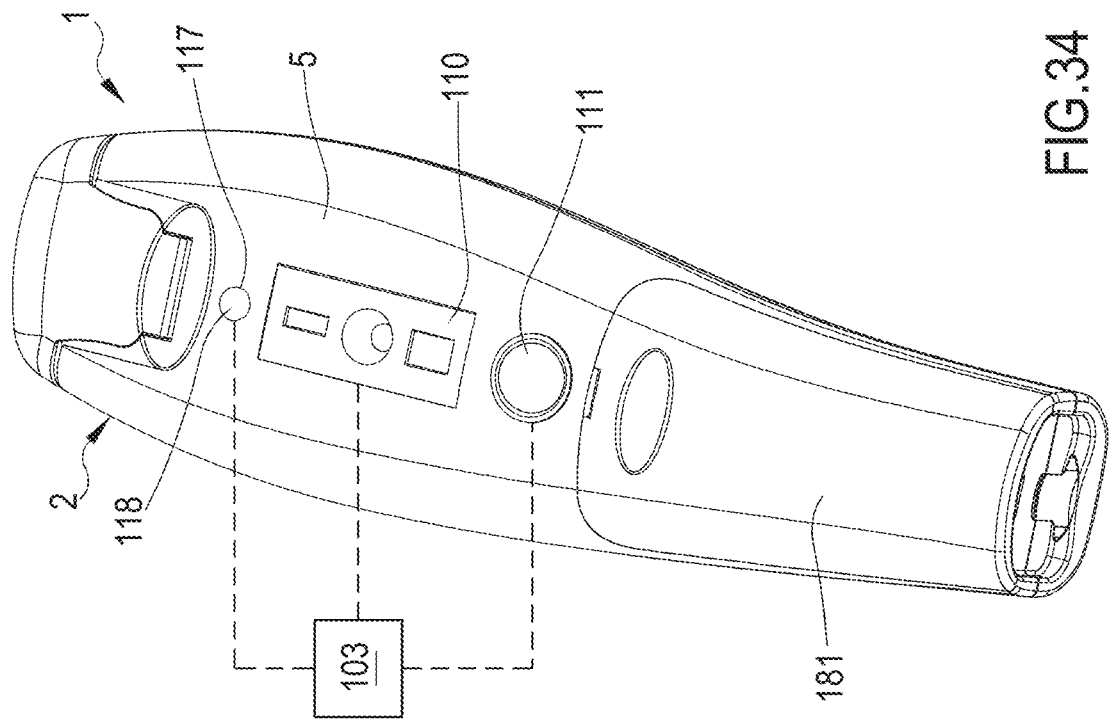
FIGS. 33-35 represent an additional embodiment of an infrared thermometer.
Figure 34:
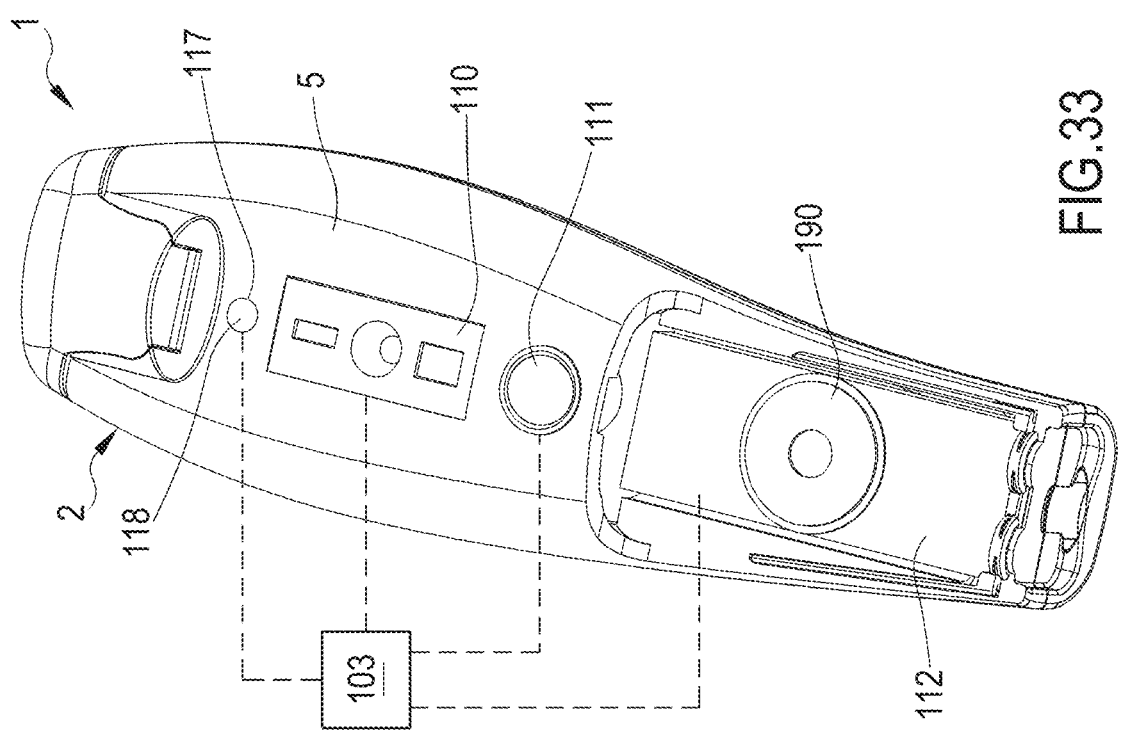
Figure 35:
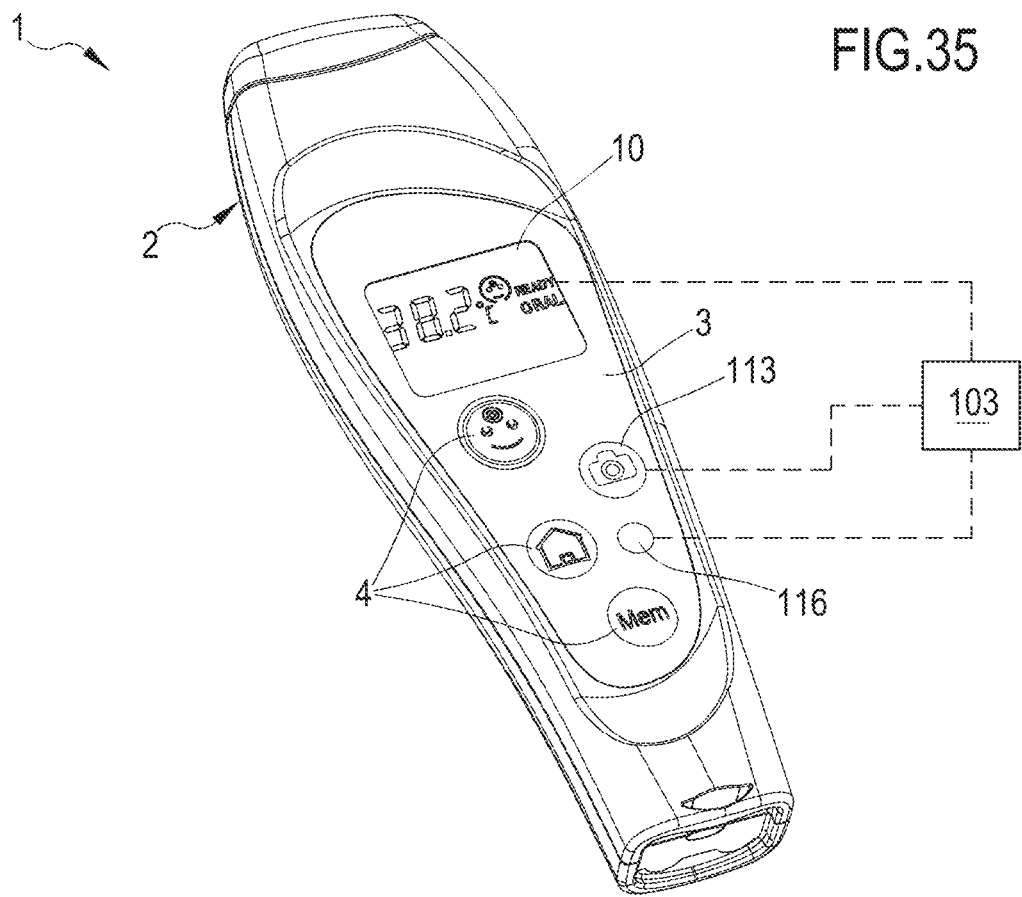

The infrared thermometer further comprises at least one transmitter 117 configured to communicate the stored status values to an external device or to an external database. In particular, the transmitter 117 is partially housed within the casing and connected to the programmable electric unit. As shown in FIGS. 33 and 34, the transmitter 117 is embedded in the casing.

Moreover, the transmitter 117 includes an antenna 118 defined on an external wall of the casing allowing the transmitter 117 to share data stored in the memory unit, with an external device or database. In particular, the transmitter can include at least one selected between a Bluetooth module, an infrared module and a Wi-Fi module. The casing includes a camera button 113 at the control portion being connected to the programmable electronic unit and configured to send to programmable electronic unit a control signal. The programmable electronic unit is configured to receive the control signal by the camera button 113 and command an auxiliary optical sensor.

In particular, the infrared thermometer includes an auxiliary optical sensor at least partially housed within the casing and configured to take an image of the body of the patient. In particular, the auxiliary optical sensor can include a camera at the gripping portion of the casing, adjacent to the optical reader 110.

The programmable electronic unit is connected to the camera and configured to receive and store in the memory unit the image captured by the camera or the data obtained analysing the captured image, for example the programmable electronic unit may be configured to save the data obtained by performing an optical character recognition of the image.

In particular, the programmable electronic unit, is configured to:

associate the image captured by the camera or the data obtained analysing the captured image (for example a text retrieve by performing a OCR process), to the identification code of the patient or the animal and the time instant in which the image is taken, save in the memory unit the image captured by the camera or the data obtained analysing the captured image and/or the identification code of the patient and the time instant in which the image is taken. The programmable electronic unit is configured to retrieve from the memory unit the image captured by the camera, the saved identification code and the time instant in which the image is taken. Moreover, the programmable electronic unit is configured to command the transmitter 117 to communicate the image captured by the camera, the saved identification code and the time instant in which the image is taken to an external device or database.

In order to record consistent status values and saving consistent images of the patient or animal, namely each having a valid identification code and respectively a valid measured temperature and an image corresponding to the correct patient or animal, the programmable electronic unit is configured to execute the step of measuring the temperature or the step of commanding the camera for acquiring an image of the patient following receipt of the identification code scanned by the optical reader 110.

Figure 36:
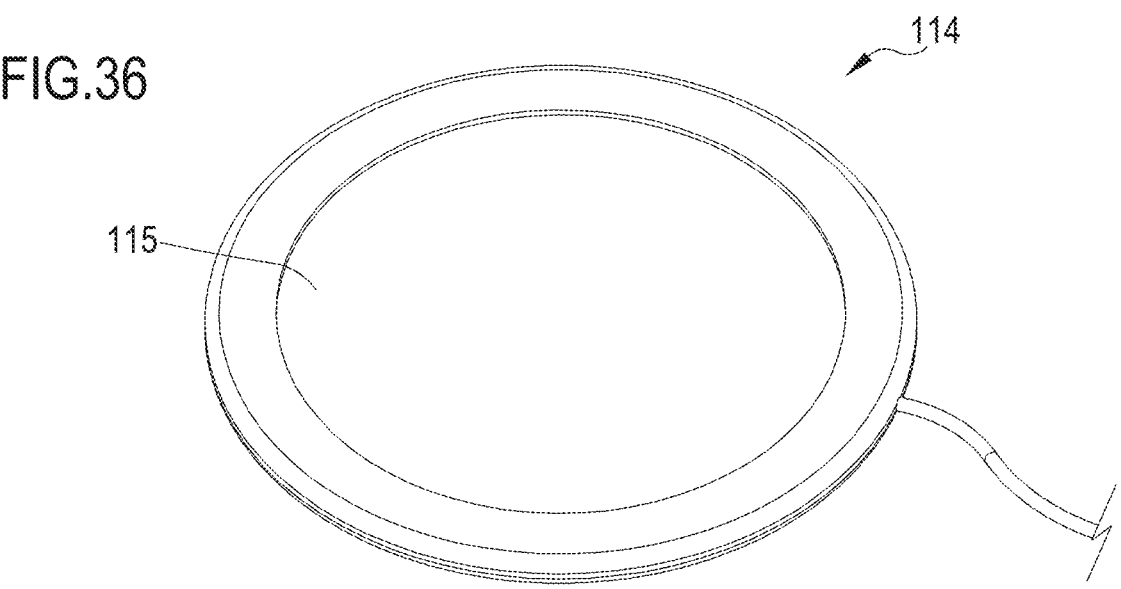
FIG. 36 is a perspective view of a recharging base plate of a system comprising the infrared thermometer according to the present invention.

The present invention is also directed to a system comprising the infrared thermometer and a power device 114 configured to transfer electricity to the infrared thermometer. As shown in FIG. 36, the power device includes a charging base plate 115 configured to wirelessly transfer electricity to the infrared thermometer. In particular, the charging base plate 115 includes an induction coil (not shown in the accompanying figures) configured to generate a magnetic field when a voltage is applied. The charging base plate 115 is therefore configured to transfer electricity to the rechargeable battery of the infrared thermometer when the infrared thermometer itself is in contact with the charging base plate. Providing a system suitable for wirelessly transfer energy to the energy accumulator 112 of the infrared thermometer, allows to design a compact casing of the infrared thermometer enhancing its portability.

Moreover, the system may comprise an application that when loaded into an infrared thermometer configures the infrared thermometer to perform the following steps:

set the programmable electronic unit for performing a temperature measurement of the patient or performing a temperature measurement of the animal, perform a calibration procedure comprising the steps of: measuring the environmental temperature, optionally measuring a surface at the environment temperature, save said environmental temperature in the memory unit, measure and display the temperature of the patient or the animal applying a respective correction coefficient.

The application may be installed in a smartphone physically connected to the infrared thermometer (FIGS. 9-11) or wirelessly connected to it. In this latter case, the transmitter 117 shares data with the smartphone, allowing the application to display the data calculated/measured by the programmable electronic unit (for example the status value) or display any data saved in the memory unit.

Moreover, the application allows the user to set the correction coefficient the programmable electronic unit has to use when calculating the temperature. The application thus may be used as an input device for selecting if a temperature measurement of the patient is going to be performed or a temperature measurement of the animal is going to be performed. Furthermore, the application allows the user to select the size, race and weight of the animal for which the correction coefficient may also vary with respect to such parameters.

The thermometer may also be used to take skin temperature trend on e.g., a wound or burn and, by taking a photo or video, the operator may then check the trend on the computer or smartphone by comparing current photo with previous photos (the screen could help the operator to optimize photos and videos).

In an additional embodiment of the present invention shown in FIGS. 37-39 and 46, the infrared thermometer 1 may comprise a handle device 160 to the casing. It is worth noting that, in an embodiment shown in FIGS. 37-39 and 46, the handle device is removably engaged to the casing. In such embodiment, the handle device may be devoid of any electronic/electrical element of electronic/electrical connection linking the casing 2 and the handle device itself. However, in another embodiment, the handle device may be fixed to the casing, defining a single body. The handle device 160 includes a housing 161 having an elongated conformation extending between a lower end portion 162 and an upper end portion 163.

Figure 37A:
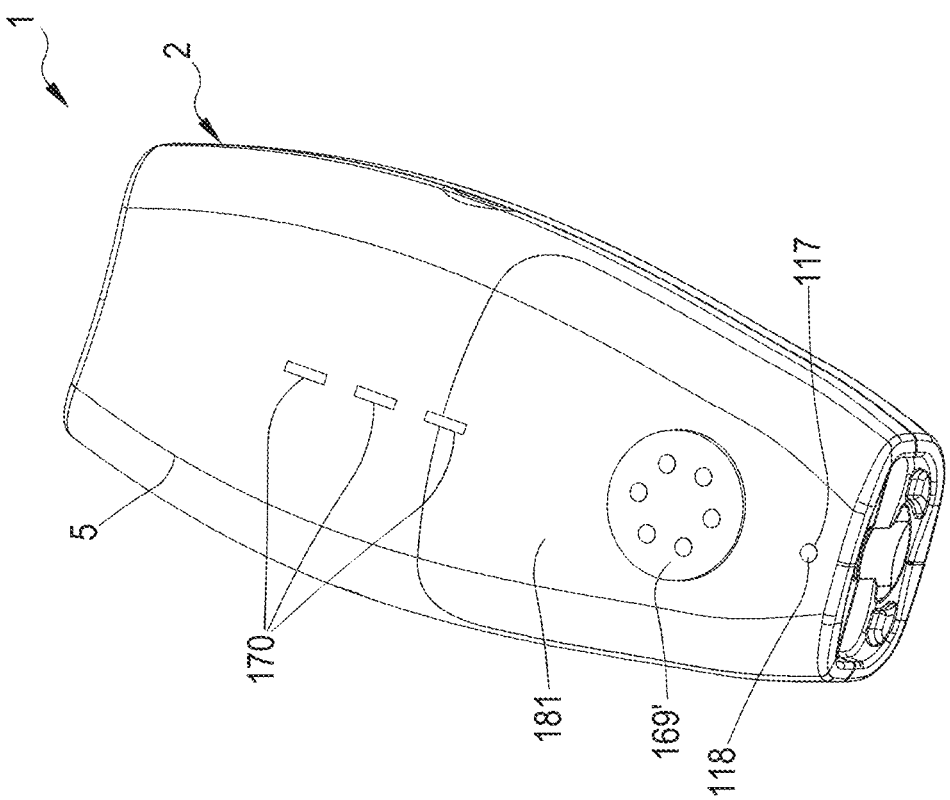
FIGS. 37A and 38 is a perspective view of an handle device engageable to a casing of an infrared thermometer according to the present invention.
Figure 37B:
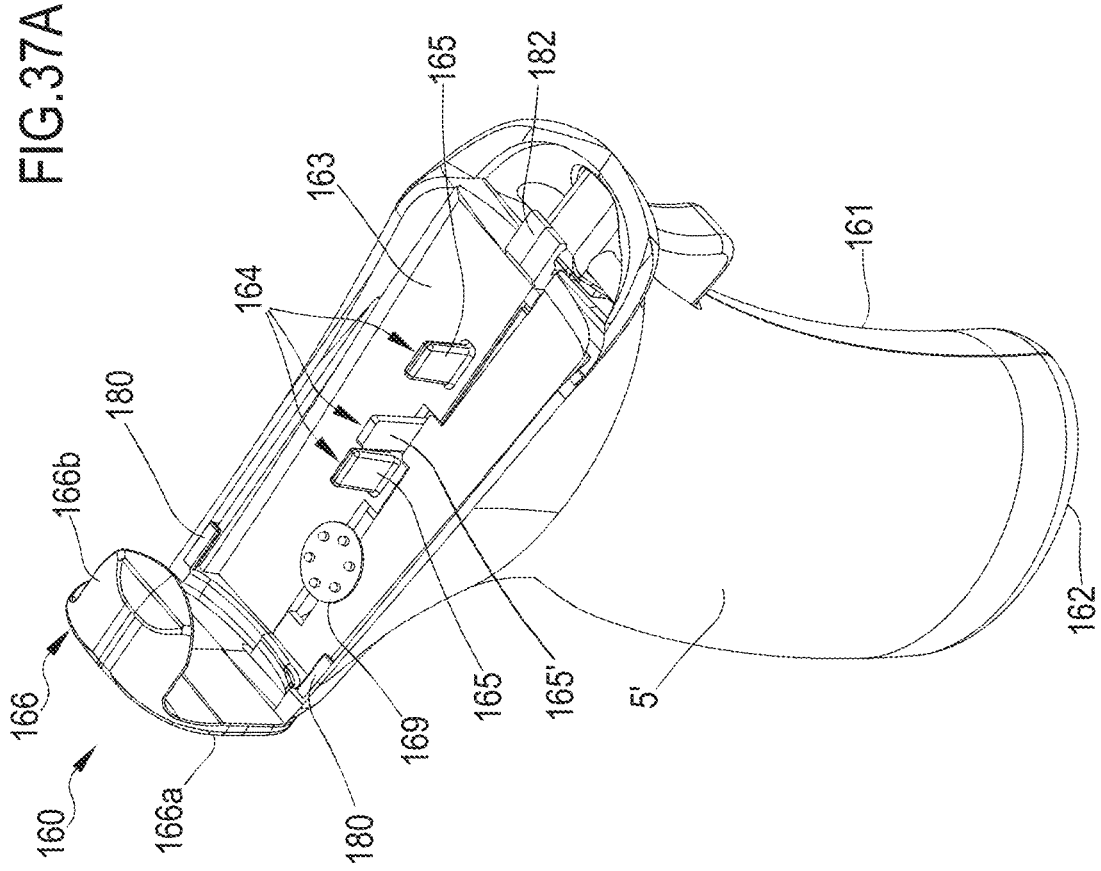
FIG. 37B is a perspective view of a further embodiment of an infrared thermometer according to the present invention.

In particular, the housing has a pistol-like conformation with an ergonomic grip portion 5' to facilitate the grip by the user, having a substantial oval transversal cross section in interposition between the lower and portion 162 and the upper end portion 163. As shown in FIG. 37A, the handle device 160 may include at least one constrain portion 164 defined at the upper end portion 163 of the housing 161, configured to engage the casing 2. In particular, the constraining portion 164 has at least one protuberance 165 fixed with the handle device and configured to be inserted within the casing 2 and engage the casing 2 to the handle device 160. Moreover, the constraining portion may comprise an auxiliary protuberance 165' fixed with a selection button 168 described below and configured to press a portion of the programmable electronic unit where the pushbuttons 4 acts. In particular, each protuberance 165 is configured to the inserted in engagement within a respective engagement portion 170 defined at the lower portion of the casing.

It is worth noting that, in an embodiment of the handle device not shown in the accompanying figures, the protuberance 165 is an electrical connector configured to provide a power and/or a data connection between the handle device and the casing. In this configuration, the protuberance 165 provides a mechanical constrain between the handle device and the casing 2, as well as an electrical connection. According to this latter embodiment the engagement portion 170 of the casing is a an electrical socket configured to receive in engagement the protuberance 165, thus establishing an electrical and or data link between the handle device and the casing. Moreover, the housing 161 of the handle device 160 may comprise a clamping portion 166 extending away from the upper end portion 163, configured to prevent any relative axial displacement between the casing 2 and the handle device. In particular, the claiming portion 166 has a lateral portion 166a fixed to the upper end portion 163 and extending transversally in prolongation of the latter, as well as a top portion 166b fixed to the top portion 166a and extending transversal to the latter. The top portion 166b is therefore configured to contact an upper wall of the casing 2, constraining the casing 2 itself against the upper end portion 163. The lateral portion 166a and the top portion 166b define a substantially "C" shape.

The housing 161 of the handle device may also comprise at least one blocking element 180 defined at the upper end portion adjacent to the clamping portion, configured to slidingly engage the casing 2. In particular, the housing 161 includes two blocking elements 180 distinct and distance from each other.

Figure 46:
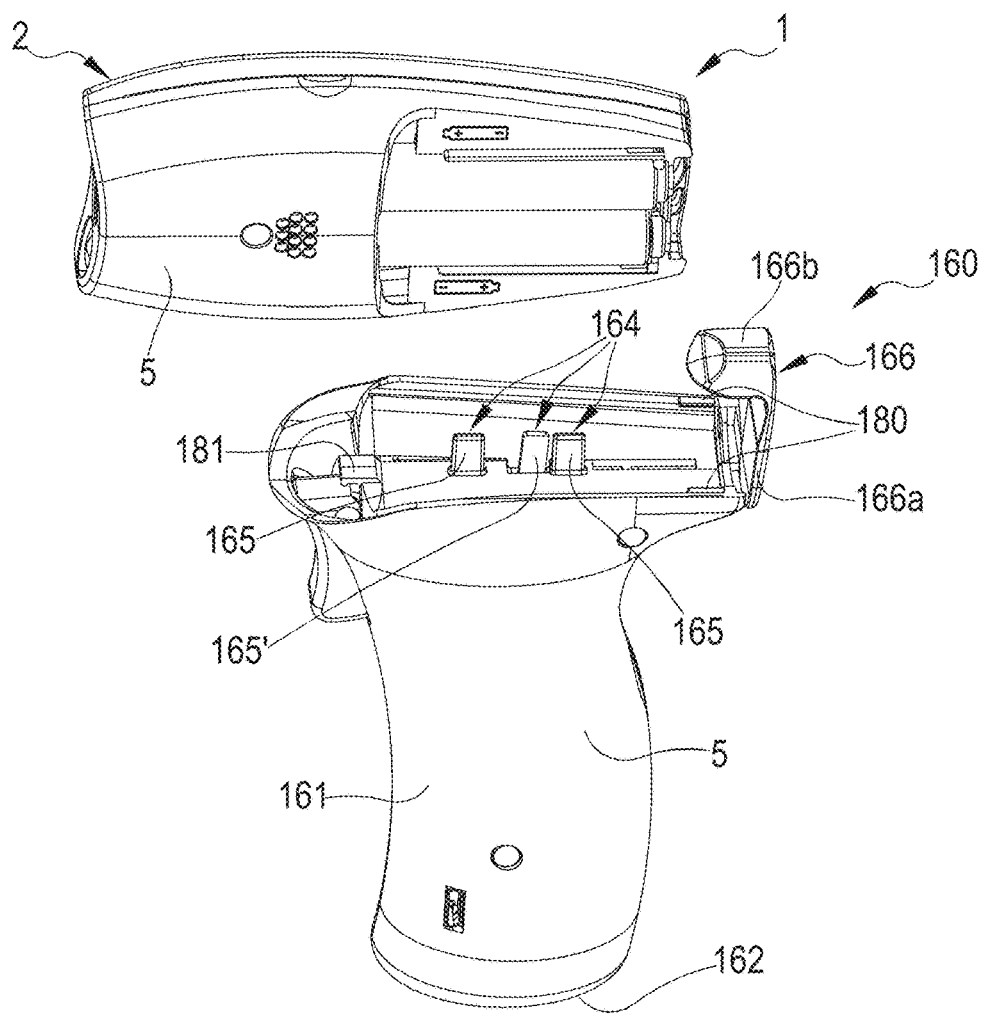
FIG. 46 is a perspective with of an handle device and a casing of an infrared thermometer according to the present invention.
Figure 47:
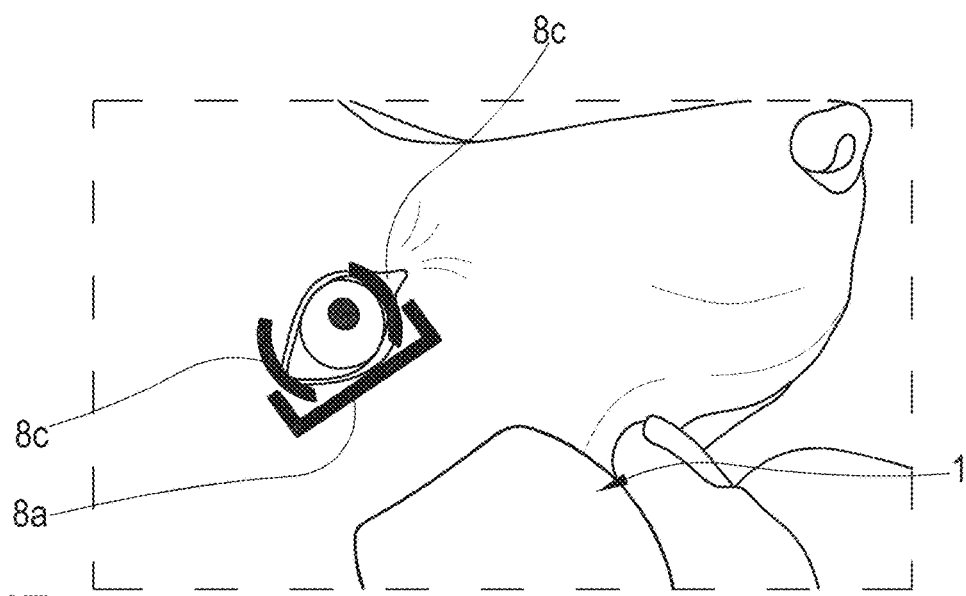
FIGS. 47-51 show the projections of the temperature of FIGS. 40-45 projected over animals.
Figure 48:
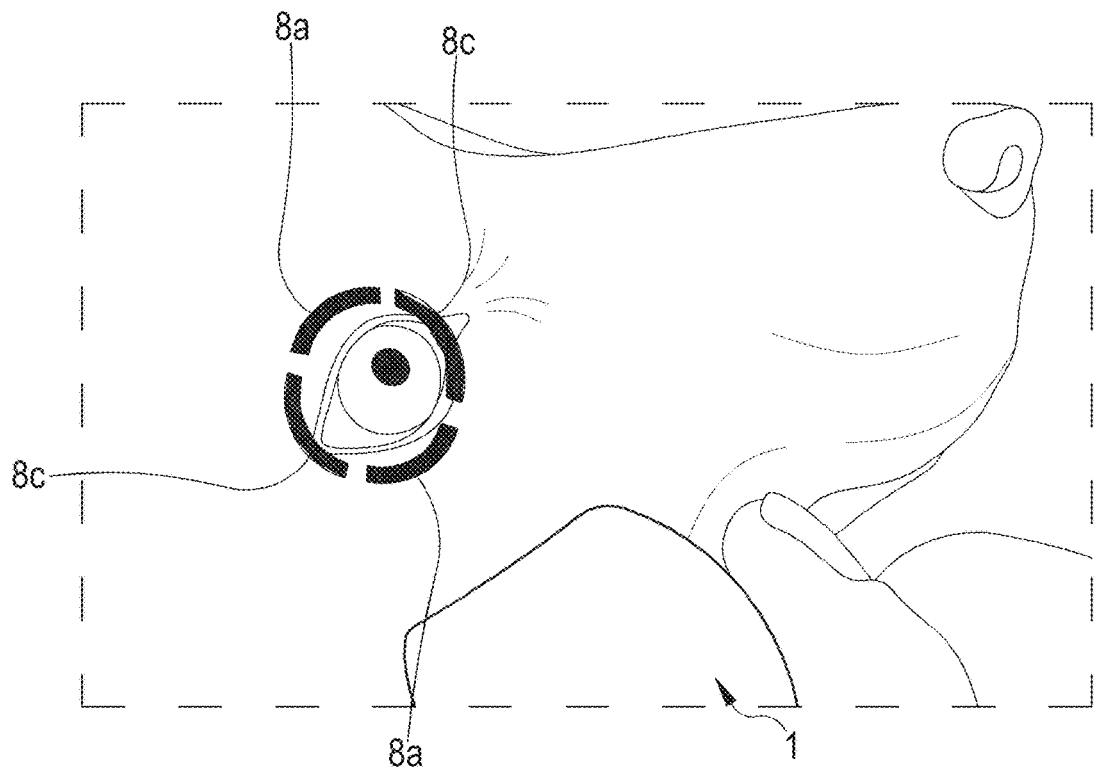
Figure 49:
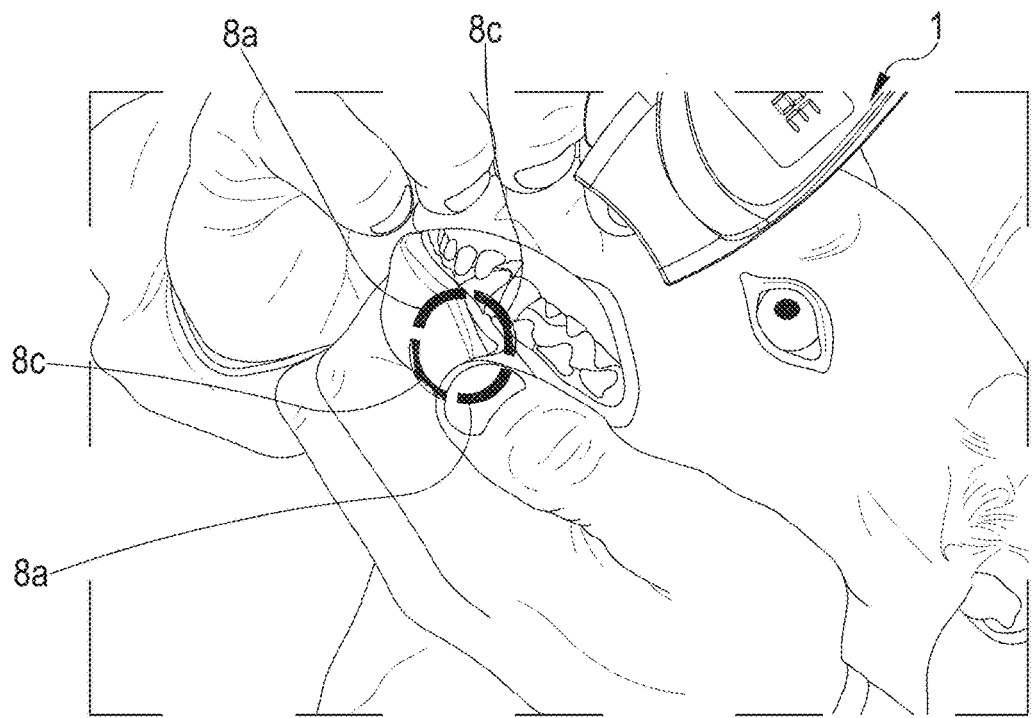
Figure 50:
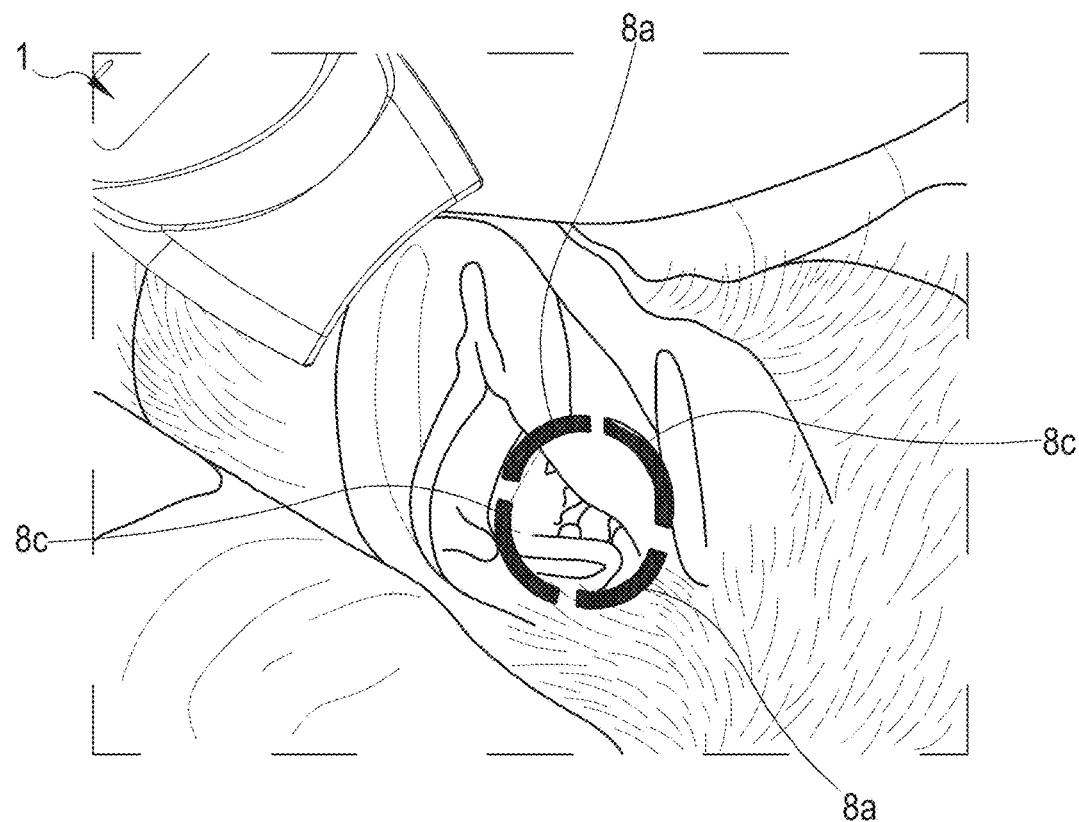

It is worth noting that, in an embodiment of the present invention shown in FIG. 46, the casing 2, in order to be engaged together with the handle device, should be devoid of a removable cover plate 181 of the casing 2 covering the rechargeable battery 112. In particular, the removable cover plate 181 is slidingly movable along rails defined on the casing 2: displacing the cover plate 181 along the rails, the removable cover plate covers the rechargeable battery 112 or leaves it exposed allowing a user to access to the inner volume of the casing. In this latter embodiment, the blocking elements are engaged to the rails of the casing 2, constraining the casing to the handle device.

Furthermore, the handle device may comprise a blocking pin 182 defined on the upper end portion of the housing opposite to the blocking elements 180 and configured to engage the casing 2. In particular, the blocking pin 182, when the cover element is removed from the casing, is configured to engage a portion of the casing left exposed by the cover plate. Moreover, the blocking pin 182 is movable with respect to the handle device and the casing, allowing to selectively disengage the casing 2 from the handle device. In other words, when the casing is engaged to the handle device, in order to disengage the casing, a user may move the blocking pin disengaging it from the casing, then disengage the blocking elements 180 from the casing and extract the protuberances 165 from the casing. Performing such steps, the casing 2 is removed from the handle device and the removable cover plate may be engaged to the casing.

Figure 39:
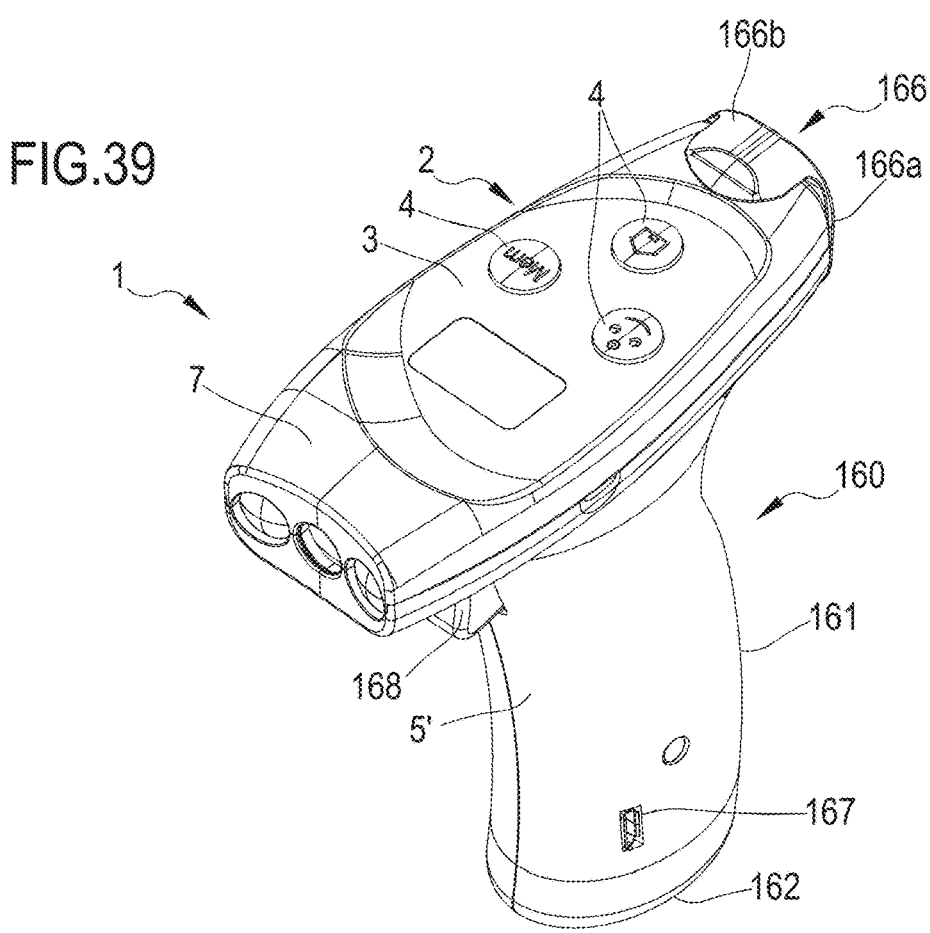
FIG. 39 is a perspective view of an handle device engaged to a casing of an infrared thermometer according to the present invention.
Figure 40:
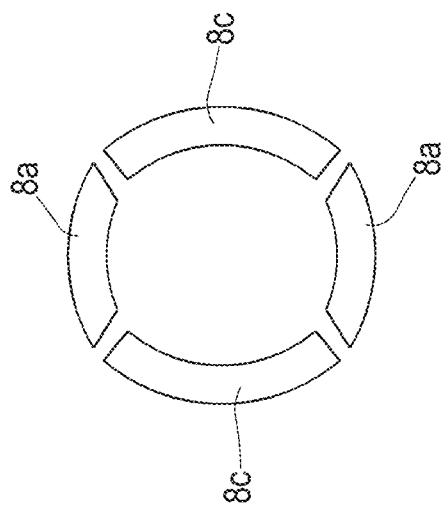
FIGS. 40-45 are alternatives of the projections of the temperature detectable by the infrared thermometer.
Figure 41:
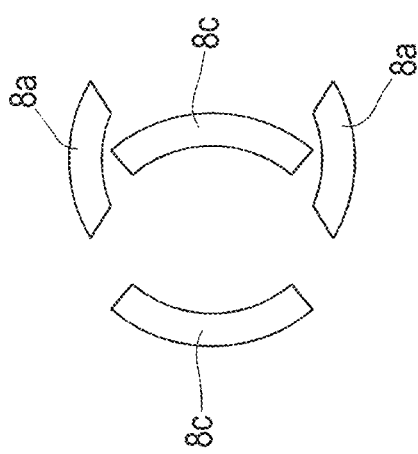

In FIG. 39 is shown the handle device engaged to casing 2, wherein the lower portion of the casing is contacting the upper end portion of the handle device, and wherein the rear portion of the casing is contacting the lateral portion 166a of the clamping portion 166. Moreover, the casing 2, when in engagement to the handle device, lies substantially orthogonally to the grip portion 5', allowing the user to easily pointing the pointing device towards the surface of the body to be measured.

Figure 38:
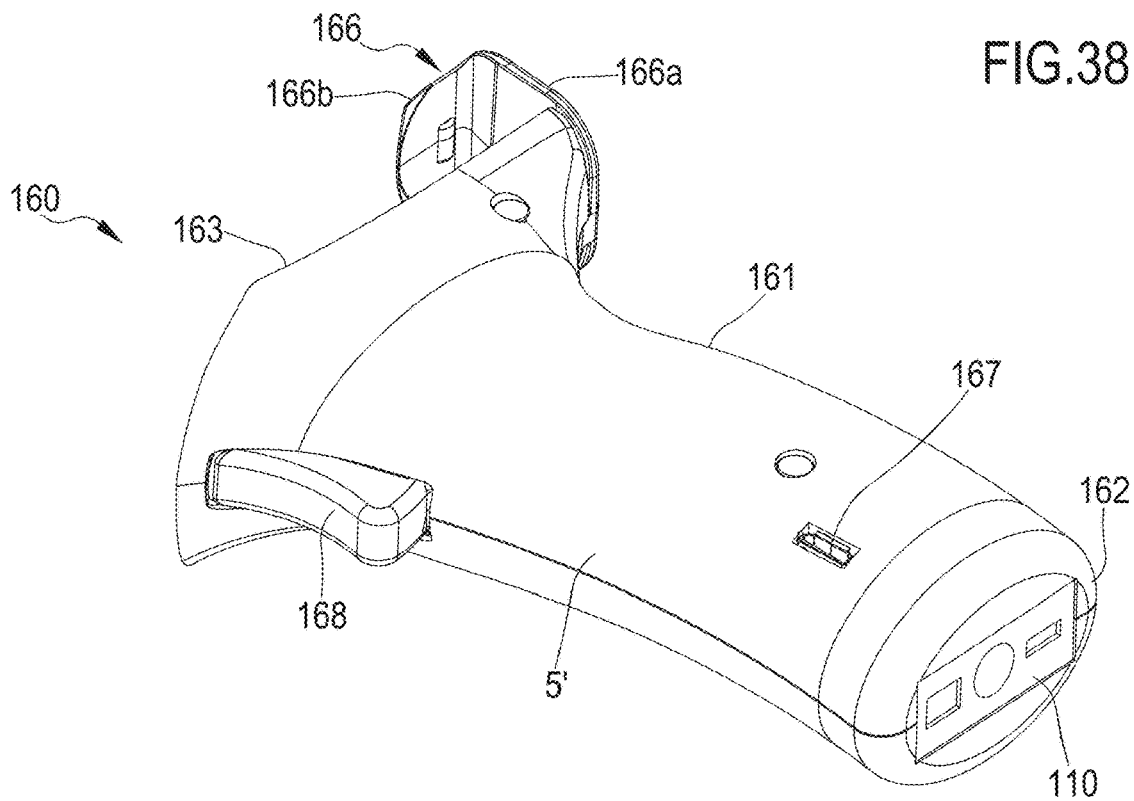

The housing 161 may also house an auxiliary rechargeable battery connectable to one or more of the programmable electronic unit, the pointing device, the optical reader and the infrared temperature detector. As also shown in FIG. 38, the handle device may include at least one socket 167 defined on the housing 161 and connected to the auxiliary rechargeable battery, configured to allow an energy transfer between a power source external the handle device 161 to the auxiliary rechargeable battery by means of a charging cable.

In particular, the socket 167 may comprise at least one selected between: a USB port, a miniUSB port, a micro-USB port, a USB-C port.

Furthermore, the handle device 160 may include at least one auxiliary selection button 168 at least partially housed within on the housing 161. In particular, as shown for example in FIG. 38, the auxiliary selection button 168 has a three-dimensional size having a substantially trigger shape. The auxiliary selection button 168 may also be movable at least between:
- a retracted position wherein a predominant part of the three-dimensional size of the auxiliary selection button 168 is housed within the housing 161,
- a released position wherein a predominant part of the three-dimensional size of the auxiliary selection button 168 lies outside the housing 161.

Furthermore, the auxiliary selection button 168 is connected to the programmable electronic unit and configured to send to the programmable electronic unit at least a confirmation signal representative of a correct temperature measurement taken by the user. Indeed, the confirmation signal is sent by the auxiliary selection button when it is in the retracted position, while the auxiliary selection button 168, in the released position, is idle.

The handle device 160 may also include a vibrating motor housed within the housing 161 of the handle device and configured to vibrate warning the user that the temperature measurement has been taken. The vibrating motor is connected to the programmable electronic unit and configured to command the vibrating motor to vibrate upon receipt of the confirmation signal emitted by the auxiliary selection button 168. The vibrating motor thus vibrates when the measurement is performed. Moreover, the programmable electronic unit is configured to command the vibrating motor to vibrate when measured temperature value is greater than a predefined threshold.

The handle device 160 may also comprise a reading sensor housed within the casing or the housing of the handle device, configured to read a frequency signal by proximity. The reading sensor is configured to receive a signal emitted by a frequency source device attached to the animal, in order to retrieve at least one of the following information:
- the weight of the animal,
- the dimensions of the animal,
- an owner value representative of an array of values including:
  - a name of the owner of the animal,
  - a surname of the owner of the animal,
  - an address of the owner of the animal.

In other words, the reading sensor is a RFID reader configured to receive and manipulate a frequency signal. The reading sensor defines a data signal as an array of values comprising at least one of the above mentioned information retrieved by the received frequency signal. The reading sensor is also connected to the programmable electronic unit and configured to send to the programmable electronic unit itself the data signal. The Programmable electronic unit is further configured to receive the data signal sent by the reading sensor and save it in the memory unit. The programmable electronic unit may also be configured to send the data signal to the transmitter 117 in order to communicate the information enclosed in the data signal itself to an external device or database.

The handle device 160 may also include an electrical connection element 169 defined at the upper end portion and configured to provide an electrical connection between the handle device 160 and the casing 2 when the casing 2 is engaged to the constraining portion. The electrical connection element links at least one between, the rechargeable battery of the handle device 160, the auxiliary selection button 168 and the optical reader of the handle device to at least one between: the programmable electronic unit, the pointing device, the optical reader and the infrared temperature detector embedded in the casing 2. It is worth noting that in an embodiment of the infrared thermometer shown in FIG. 37B, the casing 2 includes an electrical connection element 170 defined at the gripping portion and configured to abut against the electrical connection element of the handle device 160 when the casing 2 is engaged to the constraining portion of the handle device 160.

The electrical connection element 169 of the handle device 160, together with the electrical connection element 170 of the casing 2, define a power and/or data transferring bus between the handle device 160 and the casing 2. The power and data transferring bus thus define the connection between the rechargeable battery of the housing 161 and the optical reader of the handle device, together with at least one between the programmable electronic unit, the pointing device, the optical reader of the casing and the infrared temperature detector.

The handle device may also include the camera and/or the optical reader 110 according to the description reported above, wherein both are defined at the lower end portion of the housing 161. In the accompanying figures, both the camera and the optical reader 110 have been shown as fixed to the casing 2 or the housing of the handle device, however they may be removably attached to them.

The invention claimed is:

1. An infrared thermometer comprising:
a casing having a control portion, a grip portion and a pointing and detection portion;
a pointing device arranged in the pointing and detection portion of the casing, the pointing device including:
a first and a second light emitter of at least a first and a second light beam towards a destination surface of the body to be measured,
at least one shutter element positioned relative to the emitter so as to be impacted by the first light beam emitted by the first light emitter, wherein the shutter element comprises at least one plate presenting at least one through opening having a shape configured for forming a first luminous shape on said destination surface,
a display positioned relative to the emitter so as to be impacted by the second light beam emitted by the emitter, wherein the display is configured to confer to the second light beam a second luminous shape of a variable form,
an optical mechanism configured to cause a displacement of one of said first and second luminous shapes with respect to the other, as a result of a thermometer displacement relative to said destination surface, between a series of search positions relating to unsuitable distances of the infrared thermometer from said detection surface for the correct detection of the temperature of the body to be measured by the infrared thermometer and at least one detection position indicative of an ideal distance of the infrared thermometer from said detection surface for the detection of the temperature of the body to be measured by the infrared thermometer;

an infrared temperature detector at the pointing and detection portion of the casing, the infrared temperature detector being configured to detect the temperature of said destination surface at least when the first and second luminous shapes are in the detection position;

a programmable electronic unit arranged inside the casing and connected to at least the infrared temperature detector and to the pointing device, the programmable electronic unit being programmed to:

calculate a real temperature of the body when the first and second luminous shapes defined on said destination surface are in the search position corresponding to the detection position of the infrared thermometer, wherein the calculation of the real temperature of the body is made on the basis of at least the temperature detected at the destination surface, and an ambient temperature;

control the display to form of the second luminous shape corresponding to the temperature of the body calculated by the programmable electronic unit, when the infrared thermometer is in the detection position,- wherein the infrared thermometer further comprises an auxiliary optical sensor at least partially housed within the casing and configured to take an image of the body to be measured, the programmable electronic unit being connected to said auxiliary optical sensor and configured to receive and store in the memory unit the image captured by the camera.

2. The infrared thermometer according to claim 1, comprising an optical reader at least partially housed within the casing at the gripping portion, said optical reader being directly connected to the programmable electronic unit and configured to:

allow reading an identification code of a human or animal patient whose temperature is measured by the infrared thermometer, send the identification code to the programmable electronic unit, wherein the identification code is unique and allows identifying the human or animal patient.

3. The infrared thermometer according to claim 2, wherein the optical reader comprises either a QR code reader or a barcode reader.

4. The infrared thermometer according to claim 1, comprising at least one memory unit configured to store data calculated and/or measured by the programmable electronic unit, wherein the memory unit is selectively removable from the casing and configurable between:

a first operative condition wherein the memory unit is housed within the casing and connected to the programmable electronic unit, and a second operative condition wherein the memory unit is removed from the casing and unconnected to the programmable electronic unit.

5. The infrared thermometer according to claim 2, wherein the programmable electronic unit is configured to execute a temperature measuring procedure including the steps of:

reading the identification code of the patient,
measure the temperature of the patient,
provide a status value as an array of values including:
the identification code of the patient,
the temperature of the patient,
a time value representative of the time instant in which the temperature measurement is taken,
save a status value in the memory unit, wherein the programmable electronic unit is configured to execute the step of measuring the temperature of the patient following or before receipt of the identification code scanned by the optical reader.

6. The infrared thermometer according to claim 2, wherein the casing includes a selection button at the control portion, said selection button being connected to the programmable electronic unit and configured to send to the programmable electronic unit at least one of:

a confirmation signal representative of a correct temperature measurement taken by the user, a discard signal representative of a wrong temperature measurement taken by the user, wherein the step of saving the measured temperature in the memory unit occurs following receipt of the confirmation signal by the selection button.

7. The infrared thermometer according to claim 5, comprising at least one transmitter at least partially housed within the casing and connected to the programmable electronic unit, said transmitter being configured to communicate the stored status value to an external device or to an external database, wherein the transmitter includes an antenna allowing the infrared thermometer to wirelessly transmit the stored status value to an external device or database, wherein the transmitter comprises at least one selected between a Bluetooth module, an infrared module and a Wi-Fi module.

8. The infrared thermometer according to claim 2, further comprising at least one rechargeable energy accumulator connected to one or more of: the programmable electronic unit, the pointing device, the optical reader and the infrared temperature detector.

9. The infrared thermometer according to claim 8, comprising an induction coil housed within the casing at the gripping portion, said induction coil being connected to the energy accumulator and configured to wirelessly transfer energy from an external power supply to the energy accumulator.

10. The infrared thermometer according to claim 1, wherein the programmable electronic unit, following receiving the image of the body of the patient captured by the camera, is configured to:

associate the image captured by the auxiliary optical sensor to the identification code of the patient and the time instant in which the image is taken, save in the memory unit the image captured by the auxiliary optical sensor together with the identification code of the patient and the time instant in which the image is taken.

11. The infrared thermometer according to claim 2, wherein the casing is elongated and extends between a front portion where the pointing device is placed and a rear portion, the casing further comprises an upper portion and a lower portion, the optical reader being placed at the rear portion and faces downwards, a rechargeable battery being placed in correspondence of the rear portion, wherein the optical reader, the transmitter and the rechargeable battery are embedded in the casing.

12. The infrared thermometer according to claim 1, wherein the pointing device further includes a secondary light emitter of at least a secondary light beam towards a destination surface of the body to be measured, and wherein the pointing device includes at least one auxiliary shutter element positioned relative to the emitter so as to be impacted by the secondary light beam, wherein the auxiliary shutter element comprises at least one plate presenting at least one through opening having a shape configured for forming a secondary luminous shape on said destination surface.

13. An infrared thermometer comprising:
a casing having a control portion, a grip portion and a pointing and detection portion;
a pointing device arranged in the pointing and detection portion of the casing, the pointing device including:
   a first and a second light emitter of at least a first and a second light beam towards a destination surface of the body to be measured,
   at least one shutter element positioned relative to the emitter so as to be impacted by the first light beam emitted by the first light emitter, wherein the shutter element comprises at least one plate presenting at least one through opening having a shape configured for forming a first luminous shape on said destination surface,
   a display positioned relative to the emitter so as to be impacted by the second light beam emitted by the emitter, wherein the display is configured to confer to the second light beam a second luminous shape of a variable form,
   an optical mechanism configured to cause a displacement of one of said first and second luminous shapes with respect to the other, as a result of a thermometer displacement relative to said destination surface, between a series of search positions relating to unsuitable distances of the infrared thermometer from said detection surface for the correct detection of the temperature of the body to be measured by the infrared thermometer and at least one detection position indicative of an ideal distance of the infrared thermometer from said detection surface for the detection of the temperature of the body to be measured by the infrared thermometer;
an infrared temperature detector at the pointing and detection portion of the casing, the infrared temperature detector being configured to detect the temperature of said destination surface at least when the first and second luminous shapes are in the detection position;
a programmable electronic unit arranged inside the casing and connected to at least the infrared temperature detector and to the pointing device, the programmable electronic unit being programmed to:
   calculate a real temperature of the body when the first and second luminous shapes defined on said destination surface are in the search position corresponding to the detection position of the infrared thermometer, wherein the calculation of the real temperature of the body is made on the basis of the temperature detected at the destination surface, of an ambient temperature and of predetermined coefficients relating to a type of destination surface to be measured;
   control the display to form of the second luminous shape corresponding to the temperature of the body calculated by the programmable electronic unit, when the infrared thermometer is in the detection position;
an optical reader at least partially housed within the casing at the gripping portion, said optical reader being directly connected to the programmable electronic unit and configured to read a code by proximity.

14. An infrared thermometer comprising:
a casing having a control portion, a grip portion and a pointing and detection portion;
a pointing device arranged in the pointing and detection portion of the casing, the pointing device emitting a frequency signal directed towards a destination surface of the body to be measured to determine a detection position of the infrared thermometer for a correct temperature measurement,
an infrared temperature detector at the pointing and detection portion of the casing, the infrared temperature detector being configured to detect the temperature of said destination surface at least the infrared thermometer is in the detection position;
an optical reader at least partially housed within the casing at the gripping portion and configured to read a code by proximity,
a programmable electronic unit arranged inside the casing and connected to at least the infrared temperature detector, to the pointing device and to said optical reader, wherein the programmable electronic unit is programmed to:
determine the detection position of the infrared thermometer between the pointing device and the destination surface by means of the optical or the frequency signal generated by the emitter,
determine a real temperature of the body when the measuring distance corresponds to the detection position, wherein the calculation of the real temperature of the body is made on the basis of the temperature detected at the destination surface, and of a correction factor.

15. An infrared thermometer comprising:
a casing having a control portion, a grip portion and a pointing and detection portion;
a pointing device arranged in the pointing and detection portion of the casing, the pointing device including:
   a first light emitter of at least a first light beam towards a destination surface of the body to be measured,
   a secondary light emitter of at least a secondary light beam towards a destination surface of the body to be measured,
   at least one shutter element positioned relative to the emitter so as to be impacted by the first light beam, wherein the shutter element comprises at least one plate presenting at least one through opening having a shape configured for forming a first luminous shape on said destination surface,
   at least one auxiliary shutter element positioned relative to the emitter so as to be impacted by the secondary light beam, wherein the auxiliary shutter element comprises at least one plate presenting at least one through opening having a shape configured for forming a secondary luminous shape on said destination surface,
   an optical mechanism configured to cause a displacement of one of said first and secondary luminous shapes with respect to the other, as a result of a thermometer displacement relative to said destination surface, between a series of search positions relating to unsuitable distances of the infrared thermometer from said detection surface for the correct detection of the temperature of the body to be measured by the infrared thermometer and at least one detection position indicative of an ideal distance of the infrared thermometer from said detection surface for the detection of the temperature of the body to be measured by the infrared thermometer;

an infrared temperature detector at the pointing and detection portion of the casing, the infrared temperature detector being configured to detect the temperature of said destination surface at least when the first and second luminous shapes are in the detection position;

a programmable electronic unit arranged inside the casing and connected to at least the infrared temperature detector and to the pointing device, the programmable electronic unit being programmed to calculate a real temperature of the body when the first and second luminous shapes defined on said destination surface are in the search position corresponding to the detection position of the infrared thermometer, wherein the calculation of the real temperature of the body is made on the basis of at least the temperature detected at the destination surface, and a correction factor, wherein the infrared thermometer comprises:

at least one handle device removably engaged to the casing and including a housing having an elongated conformation extending between a lower end portion and an upper end portion, wherein the handle device comprises at least one constrain portion defined at the upper end portion of the housing of the handle device, said constraining portion having at least one protuberance configured to engage the casing to the handle device;

at least partially housed within the housing of the handle device at the lower end portion, said optical reader being connected to the programmable electronic unit and configured to:

allow reading an identification code representative of a patient or an animal whose temperature is measured by the infrared thermometer, send the identification code to the programmable electronic unit, wherein the identification code is unique and allows identifying the patient or the animal.

16. The infrared thermometer according to claim 15, wherein the optical mechanism of the pointing device comprises one or more lenses arranged at the pointing and detection portion, the lenses being configured so as deflect one or both the first light beam and the second light beam to align the first and secondary luminous shapes in the detection position when the infrared thermometer is at the ideal distance for the detection of the temperature of the body to be measured, and wherein at least one lens of the optical mechanism is a biconvex lens able to concentrate and focus light at a predetermined distance.

17. The infrared thermometer according to claim 16, wherein the auxiliary shutter element is defined at the pointing and detection portion and is interposed between the first light emitter and the destination surface of the body to be measured, the auxiliary shutter element having at least one through opening having the shape to be given to the secondary light beam to define the secondary luminous shapes on the destination surface of the body to be measured, the through opening of the shutter element being impacted by the secondary light beam.

18. The infrared thermometer according to claim 17, wherein the through opening of the auxiliary shutter element has a shape that gives to the secondary luminous shape a form at least selected among:

the form of a single arc,
the form of at least two arcs with opposite concavities,
the form of a polygonal chain having a central segment from whose ends two respective lateral segments extend perpendicularly,
the form of a laid-down "C",
the form of two points distanced from each other, the form of a circle, defined by a plurality of distributed points, and
the form of a circle, defined by a continuous or substantially continuous line.

19. The infrared thermometer according to claim 14, comprising at least one handle device removably engaged to the casing and including a housing having an elongated conformation extending between a lower end portion and an upper end portion, wherein the handle device comprises at least one constrain portion defined at the upper end portion of the housing of the handle device, said constraining portion having at least one protuberance configured to engage the casing to the handle device.

20. The infrared thermometer according to claim 15, wherein the housing of the handle device has a clamping portion extending away from the upper end portion to engage the casing, said clamping portion having a shape configured to prevent a displacement of the casing with respect to the housing of the handle device.

21. (The infrared thermometer of claim 20, wherein, when the casing is constrained to the handle device, the rear portion of the casing is in contact with the clamping portion and the lower portion of the casing is in contact with the upper end portion of the handle device, wherein the casing lies substantially orthogonally to a grip portion in interposition between the upper end portion and the lower end portion of the housing.

22. The infrared thermometer according to claim 15, comprising an optical reader at least partially housed within the housing of the handle device at the lower end portion, said optical reader being connected to the programmable electronic unit and configured to:

allow reading an identification code representative of a patient or an animal whose temperature is measured by the infrared thermometer, send the identification code to the programmable electronic unit, wherein the identification code is unique and allows identifying the patient or the animal.

23. The infrared thermometer according to claim 15, comprising at least one auxiliary rechargeable battery housed within the housing of the handle device, wherein the auxiliary rechargeable battery is connectable to one or more of: the programmable electronic unit, the pointing device, the optical reader and the infrared temperature detector.

24. The infrared thermometer according to claim 15, wherein the handle device includes at least one auxiliary selection button at least partially housed within on the housing, said auxiliary selection button being connected to the programmable electronic unit and configured to send to the programmable electronic unit at least a confirmation signal to acquire a temperature reading, wherein the auxiliary selection button has a three-dimensional size, said auxiliary selection button being movable at least between:

a retracted position wherein a part of the three-dimensional size of the auxiliary selection button is housed within the housing of the handle device, a released position wherein the part of the three-dimensional size of the auxiliary selection button lies outside the housing of the handle device.

25. The infrared thermometer according to claim 15, comprising at least one reading sensor housed within the casing or the housing of the handle device, configured to read a frequency signal by proximity,
wherein the reading sensor is configured to retrieve from the frequency signal at least one of the following information:
the name or the code of the animal,
the weight of the animal,
the dimensions of the animal,
an owner value representative of an array of values including:
a name of the owner of the animal,
a surname of the owner of the animal,
an address of the owner of the animal,
wherein the reading sensor defines a data signal as an array of values comprising at least one of the information retrieved by the measured frequency signal.

26. The infrared thermometer according to claim 15, wherein the handle device comprises an electrical connection element placed at the upper end portion, configured to provide an electrical connection between the handle device and the casing when the casing is engaged to the handle device, wherein the electrical connection element links at least one between, the rechargeable battery of the handle device, the auxiliary selection button and the optical reader of the handle device to at least one between: the programmable electronic unit, the pointing device, the optical reader and the infrared temperature detector embedded in the casing, the casing including an electrical connection element defined at the gripping portion and configured to abut against the electrical connection element of the handle device when the casing is engaged to the handle device, wherein the electrical connection element of the handle device, together with the electrical connection element of the casing, define a data transfer bus between the handle device and the casing.

27. The infrared thermometer according to claim 25, wherein the programmable electronic unit is configured to execute a temperature measuring procedure including the steps of:
allowing reading the identification code of the patient or the animal,
measure the temperature of the patient or the animal,
provide a status value as an array of values including:
the identification code of the patient or the animal,
the temperature of the patient or the animal,
a time value representative of the time instant in which the temperature measurement is taken,
save a status value in the memory unit.

28. The infrared thermometer according to claim 27, wherein the step of measuring the temperature of the patient or the animal comprises the following sub-steps:
set the programmable electronic unit for performing a temperature measurement of the patient or set the programmable electronic unit for performing a temperature measurement of the animal,
measure the temperature of the patient or the animal applying a respective correction coefficient,
wherein, while measuring the temperature of an animal, the correction coefficient varies according to at least one of the following parameters:
the size of the animal,
the race of the animal,
the weight of the animal,
the area where the measurement is taken in the animal.

29. An infrared thermometer comprising:
a casing having a control portion, a grip portion and a pointing and detection portion;
a pointing device arranged in the pointing and detection portion of the casing, the pointing device including:
a first and a second light emitter of at least a first and a second light beam towards a destination surface of the body to be measured,
at least one shutter element positioned relative to the emitter so as to be impacted by the first light beam emitted by the first light emitter, wherein the shutter element comprises at least one plate presenting at least one through opening having a shape configured for forming a first luminous shape on said destination surface,
a display positioned relative to the emitter so as to be impacted by the second light beam emitted by the emitter, wherein the display is configured to confer to the second light beam a second luminous shape of a variable form,
an optical mechanism configured to cause a displacement of one of said first and second luminous shapes with respect to the other, as a result of a thermometer displacement relative to said destination surface, between a series of search positions relating to unsuitable distances of the infrared thermometer from said detection surface for the correct detection of the temperature of the body to be measured by the infrared thermometer and at least one detection position indicative of an ideal distance of the infrared thermometer from said detection surface for the detection of the temperature of the body to be measured by the infrared thermometer;
an infrared temperature detector at the pointing and detection portion of the casing, the infrared temperature detector being configured to detect the temperature of said destination surface at least when the first and second luminous shapes are in the detection position;
a programmable electronic unit arranged inside the casing and connected to at least the infrared temperature detector and to the pointing device, the programmable electronic unit being programmed to:
calculate a real temperature of the body when the first and second luminous shapes defined on said destination surface are in the search position corresponding to the detection position of the infrared thermometer, wherein the calculation of the real temperature of the body is made on the basis of at least the temperature detected at the destination surface, and an ambient temperature;
control the display to form of the second luminous shape corresponding to the temperature of the body calculated by the programmable electronic unit, when the infrared thermometer is in the detection position, wherein the infrared thermometer further comprises at least one memory unit configured to store data calculated and/or measured by the programmable electronic unit, wherein the memory unit is selectively removable from the casing and configurable between:
a first operative condition wherein the memory unit is housed within the casing and connected to the programmable electronic unit, and
a second operative condition wherein the memory unit is removed from the casing and unconnected to the programmable electronic unit.

30. The infrared thermometer according to claim 29, comprising an auxiliary optical sensor at least partially housed within the casing and configured to take an image of the body to be measured, the programmable electronic unit being connected to said auxiliary optical sensor and configured to receive and store in the memory unit the image captured by the camera.

\* \* \* \* \*